United States Patent
Li et al.

(10) Patent No.: US 10,264,503 B2
(45) Date of Patent: Apr. 16, 2019

(54) METHOD AND APPARATUS FOR ASSISTING TERMINAL IN MEASURING

(71) Applicant: Huawei Technologies Co., Ltd., Shenzhen (CN)

(72) Inventors: Qiang Li, Beijing (CN); Yongxia Lyu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/880,993

(22) Filed: Oct. 12, 2015

(65) Prior Publication Data

US 2016/0037426 A1 Feb. 4, 2016

Related U.S. Application Data

(63) Continuation of application No. PCT/CN2013/074178, filed on Apr. 12, 2013.

(51) Int. Cl.
H04B 7/00 (2006.01)
H04W 36/30 (2009.01)
H04W 36/00 (2009.01)
(Continued)

(52) U.S. Cl.
CPC .......... *H04W 36/30* (2013.01); *H04L 5/0048* (2013.01); *H04W 36/0094* (2013.01); *H04W 36/04* (2013.01)

(58) Field of Classification Search
None
See application file for complete search history.

(56) References Cited

U.S. PATENT DOCUMENTS

| 5,828,661 A | 10/1998 | Weaver, Jr. et al. |
| 2009/0129341 A1* | 5/2009 | Balasubramanian ...... H04W 36/0055 370/331 |

(Continued)

FOREIGN PATENT DOCUMENTS

| CN | 1262847 A | 8/2000 |
| CN | 101827384 A | 9/2010 |

(Continued)

OTHER PUBLICATIONS

U.S. Appl. No. 61/750,756, filed Jan. 9, 2013. (Year: 2013).*

(Continued)

*Primary Examiner* — Sithu Ko
(74) *Attorney, Agent, or Firm* — Leydig, Voit & Mayer, Ltd.

(57) ABSTRACT

The present invention discloses a method and an apparatus for assisting a terminal in measuring, which relate to the field of communications network technologies and may implement correct measurement on signal strength of a micro base station, thereby preventing UE from incorrectly determining the signal strength of the micro base station. In embodiments of the present invention, a first base station receives a measurement result for a second base station sent by UE, where the first base station provides a service for the UE; the first base station determines, according to the measurement result, whether a handover operation needs to be started; when the handover operation needs to be started, the first base station instructs the second base station to start up, and hands over the UE to the second base station for a service provided by the second base station.

14 Claims, 11 Drawing Sheets

(51) Int. Cl.
*H04L 5/00* (2006.01)
*H04W 36/04* (2009.01)

(56) References Cited

U.S. PATENT DOCUMENTS

| | | | |
|---|---|---|---|
| 2010/0027510 A1 | 2/2010 | Balasubramanian et al. | |
| 2011/0092234 A1* | 4/2011 | Kim | H04W 48/14 455/507 |
| 2013/0040640 A1* | 2/2013 | Chen | H04W 36/30 455/434 |
| 2013/0244736 A1* | 9/2013 | Ho | H04W 52/0251 455/574 |
| 2013/0301439 A1* | 11/2013 | Heo | H04W 76/048 370/252 |
| 2015/0215852 A1* | 7/2015 | Gou | H04W 48/16 455/434 |
| 2015/0358094 A1* | 12/2015 | Yi | H04B 17/318 370/252 |

FOREIGN PATENT DOCUMENTS

| | | |
|---|---|---|
| CN | 102045807 A | 5/2011 |
| CN | 102113385 A | 6/2011 |
| CN | 102883408 A | 1/2013 |
| EP | 2312889 A1 | 4/2011 |
| WO | 2011082597 A1 | 7/2011 |

OTHER PUBLICATIONS

"CSI-RS based RRM measurement for synchronized NCT," 3GPP TSG RAN WG1 Meeting #72, St. Julian's, Malta, R1-130178, 3$^{rd}$ Generation Partnership Project, Valbonne, France (Jan. 28-Feb. 1, 2013).

"Discussion about RRM and mobility for small cell scenario," 3GPP TSG-RAN WG2 Meeting #81, Malta, R2-130658, 3$^{rd}$ Generation Partnership Project, Valbonne, France (Jan. 28-Feb. 1, 2013).

"On Scenarios and Necessity of Standalone NCT," 3GPP TSG-RAN WG1 #72bis, Chicago, Illinois, R1-131173, 3$^{rd}$ Generation Partnership Project, Valbonne, France (Apr. 15-19, 2013).

"Comparison of eNB Dormant Schemes—DL Based vs. UL Based," 3GPP TSG RAN WG1 Meeting #72bis, Chicago, Illinois, R1-131424, 3$^{rd}$ Generation Partnership Project, Valbonne, France (Apr. 15-19, 2013).

"Considerations on a new physical layer small cell discovery signal," 3GPP TSG-RAN1 #72bis, Chicago, Illinois, R1-131049, 3$^{rd}$ Generation Partnership Project, Valbonne, France (Apr. 15-19, 2013).

"Small Cell Discovery in HetNet," 3GPP TSG RAN WG2 Meeting #75bis, Zhuhai, China, R2-115169 (Oct. 10-14, 2011).

"Methods for Efficient Discovery of Small Cells," 3GPP TSG-RAN WG1 #72, St. Julian's, Malta, R1-130225 (Jan. 28-Feb. 1, 2013).

"CC de(activation) status after reconfiguration," 3GPP TSG-RAN WG2 Meeting #70, Montreal, Canada, R2-103009, 3$^{rd}$ Generation Partnership Project, Valbonne, France (May 10-14, 2010).

"Considerations on evaluation and scenarios for standalone NCT," 3GPP TSG RAN WG1 Meeting #72BIS, Chicago, USA, R1-131122, XP50697062A, 3rd Generation Partnership Project, Valbonne, France (Apr. 15-19, 2013).

* cited by examiner

METHOD AND APPARATUS FOR ASSISTING TERMINAL IN MEASURING

CROSS-REFERENCE TO RELATED APPLICATIONS

This application is a continuation of International Patent Application No. PCT/CN2013/074178, filed Apr. 12, 2013, which is hereby incorporated by reference in its entirety.

TECHNICAL FIELD

The present invention relates to the field of communications network technologies, and in particular, to a method and an apparatus for assisting a terminal in measuring.

BACKGROUND

In a cellular system, to expand a capacity and a coverage scope of a hotspot area, a concept of a heterogeneous network is introduced. In the heterogeneous network, a macro base station is responsible for coverage of a wide scope, and a low power node (LPN) or a micro base station is adopted to cover a hotspot area. The micro base station has a small coverage scope, and users often change, thereby causing that a state in which UE is not served for a relatively long time. In this case, the micro base station is usually disabled, that is, most energy-consuming elements of the micro base station are disabled, so that power can be reduced and interference to a neighboring cell can be reduced.

In the prior art, the micro base station is in a sleep state after being disabled, periodic sending of a discovery pilot (Discovery Reference Signal, DRS) signal is usually adopted, so that when a user approaches the coverage scope of the micro base station, the DRS signal can be detected by user equipment (UE), and the UE determines signal strength of the micro base station by using the DRS signal.

However, because the DRS signal is a sparse synchronization signal in a time domain, and a time period is in seconds or longer, two situations occur: The first one is that a signal of a neighboring micro base station is not strong enough, but a location at which the DRS signal is located is at a crest of a fast fading channel, so that the UE incorrectly determines that the signal of the micro base station can serve the UE itself; the second one is that the signal of the neighboring micro base station is strong enough, but the location at which the DRS signal is located is at a trough of the channel, so that the UE considers that the signal of the micro base station is not strong enough to serve the UE itself.

SUMMARY

Embodiments of the present invention provide a method and an apparatus for assisting a terminal in measuring, which may implement correct measurement on signal strength of a micro base station, thereby preventing UE from incorrectly determining the signal strength of the micro base station.

According to a first aspect, the present invention provides a method for assisting a terminal in measuring, including:

receiving, by a first base station, a measurement result for a second base station sent by user equipment UE, where the first base station provides a service for the UE;

determining, by the first base station according to the measurement result, whether a handover operation needs to be started; and instructing, by the first base station when the handover operation needs to be started, the second base station to start up, and handing over the UE to the second base station for a service provided by the second base station.

According to a second aspect, the present invention provides a method for assisting a terminal in measuring, including:

receiving, by user equipment UE after detecting a discovery pilot DRS signal sent by a second base station, a radio resource management pilot RRM-RS signal sent by the second base station;

performing, by the UE, measurement on the second base station according to the RRM-RS signal to obtain a measurement result; and sending, by the UE, the measurement result to a first base station, so that the first base station instructs, according to the measurement result, the second base station to start up, and hands over the UE to the second base station.

According to a third aspect, the present invention provides a method for assisting a terminal in measuring, including:

periodically sending, by a second base station, a discovery pilot DRS signal; and sending, by the second base station, a radio resource management pilot RRM-RS signal, so that user equipment UE performs measurement on the second base station according to the RRM-RS signal after detecting the DRS signal.

According to a fourth aspect, the present invention provides an apparatus for assisting a terminal in measuring, located in a first base station and including:

a receiving module, configured to receive a measurement result for a second base station sent by user equipment UE, where the first base station provides a service for the UE; and provide the measurement result for a determining module;

the determining module, configured to determine, according to the measurement result received by the receiving module, whether a handover operation needs to be started, and provide a result of the determining for a processing module; and the processing module, configured to: instruct, according to the result determined by the determining module that the handover operation needs to be started, the second base station to start up, and hand over the UE to the second base station for a service provided by the second base station.

According to a fifth aspect, the present invention provides an apparatus for assisting a terminal in measuring, including:

a detection module, configured to detect a discovery pilot DRS signal sent by a second base station;

a receiving module, configured to: after the detection module detects the DRS signal, receive a radio resource management pilot RRM-RS signal sent by the second base station, and provide the RRM-RS signal for a measurement module;

the measurement module, configured to perform, according to the RRM-RS signal received by the receiving module, measurement on the second base station to obtain a measurement result, and provide the measurement result for a sending module; and the sending module, configured to send the measurement result obtained by the measurement module to a first base station, so that the first base station instructs, according to the measurement result, the second base station to start up, and hands over the UE to the second base station.

According to a sixth aspect, the present invention provides an apparatus for assisting a terminal in measuring, located in a second base station and including:

a first sending module, configured to periodically send a discovery pilot DRS signal; and a second sending module, configured to send a radio resource management pilot RRM-RS signal, so that user equipment UE performs measurement on the second base station according to the RRM-RS signal after detecting the DRS signal.

According to a seventh aspect, the present invention provides an apparatus for assisting a terminal in measuring, located in a first base station and including:

a memory, configured to store information including a program routine;

a receiver, configured to receive a measurement result for a second base station sent by user equipment UE, where the first base station provides a service for the UE; and provide the measurement result for a processor; and the processor, connected to the memory and the receiver, configured to control execution of the program routine, and specifically configured to determine, according to the measurement result received by the receiver, whether a handover operation needs to be started; when the handover operation needs to be started, instruct the second base station to start up, and hand over the UE to the second base station for a service provided by the second base station.

According to an eighth aspect, the present invention provides an apparatus for assisting a terminal in measuring, including:

a memory, configured to store information including a program routine;

a receiver, configured to receive a discovery pilot DRS signal sent by a second base station, receive a radio resource management pilot RRM-RS signal, and provide the RRM-RS signal for a processor;

the processor, connected to the memory, the receiver, and a transmitter, configured to control execution of the program routine, and specifically configured to perform, according to the RRM-RS signal received by the receiver, measurement on the second base station to obtain a measurement result, and provide the measurement result for the transmitter; and the transmitter, configured to send the measurement result obtained by the processor to a first base station, so that the first base station instructs, according to the measurement result, the second base station to start up, and hands over the UE to the second base station.

According to a ninth aspect, the present invention provides an apparatus for assisting a terminal in measuring, located in a second base station and including:

a receiver, a transmitter, a memory, and a processor that is separately connected to the receiver, the transmitter, and the memory, where:

the memory is configured to store information including a program routine; and the transmitter is configured to periodically send a discovery pilot DRS signal, and send a radio resource management pilot RRM-RS signal, so that user equipment UE performs measurement on the second base station according to the RRM-RS signal after detecting the DRS signal.

In the method and the apparatus for assisting a terminal in measuring according to the embodiments of the present invention, a first base station receives a measurement result for a second base station sent by UE, where the first base station provides a service for the UE; the first base station determines, according to the measurement result, whether a handover operation needs to be started; when the handover operation needs to be started, the first base station instructs the second base station to start up, and hands over the UE to the second base station for a service provided by the second base station. Compared with a problem in the prior art that because a DRS signal is a sparse synchronization signal in a time domain, and a time period is in seconds or longer, the UE performs erroneous determining on a signal of the second base station, in the embodiments of the present invention, correct measurement on signal strength of a micro base station may be implemented, thereby preventing the UE from incorrectly determining the signal strength of the micro base station.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
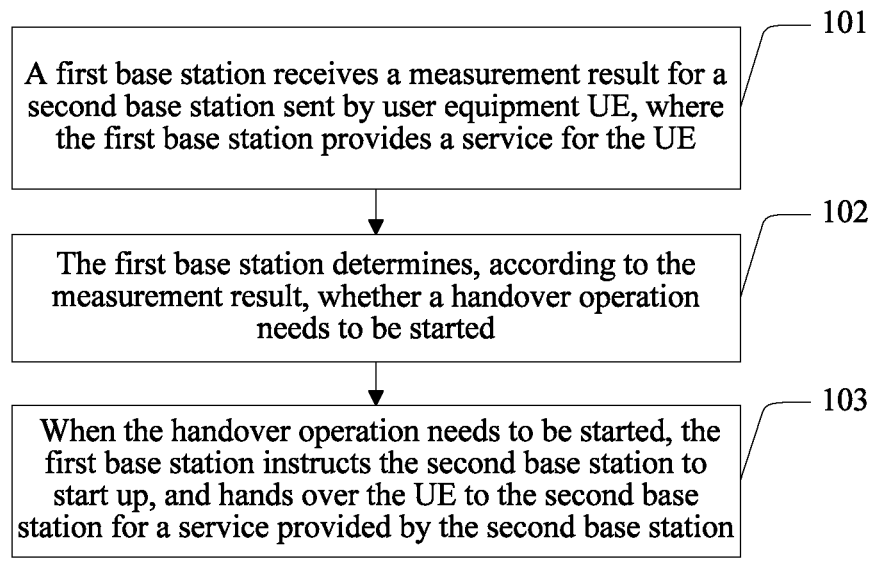
FIG. 1 is a flowchart of a method for assisting a terminal in measuring according to an embodiment of the present invention.

As shown in FIG. 1, an embodiment of the present invention provides a method for assisting a terminal in measuring, the method is executed by a first base station, and the first base station may be specifically a macro base station. The method includes the following steps:

Step 101: The first base station receives a measurement result for a second base station and sent by UE, where the first base station provides a service for the UE.

In this embodiment, the first base station may be a macro base station, and the second base station may be a micro base station. The macro base station has a strong signal, a wide coverage scope, heavy traffic to bear, and a large floor area; the micro base station has low power, a small floor area, a small signal coverage scope, easy planning, and a capability of increasing a hotspot capacity.

The measurement result of the second base station includes reference signal received power (RSRP) and reference signal received quality (RSRQ).

Step 102: The first base station determines, according to the measurement result, whether a handover operation needs to be started.

The first base station may analyze the measurement result by using a handover decision algorithm to determine whether the first base station needs to start the handover operation. For example, when a value of the RSRP in the measurement result is greater than or equal to a threshold CH1, and when a value of the RSRQ is greater than or equal to a threshold CH2, the first base station determines to start the handover operation. On the contrary, when the value of the RSRP in the measurement result is less than the threshold CH1, and/or when the value of the RSRQ is less than the threshold CH2, the first base station determines not to start the handover operation.

Step 103: When the handover operation needs to be started, the first base station instructs the second base station to start up, and hands over the UE to the second base station for a service provided by the second base station.

When the first base station determines, by using the handover decision algorithm, that the measurement result corresponding to the second base station meets a requirement, the first base station needs to start the handover operation and send a wake-up instruction to the second base station, where the wake-up instruction is used to instruct the second base station to start up. After the second base station receives the wake-up instruction sent by the first base station, the second base station starts up, that is, the second base station is in an activated state, and the first base station hands over the UE to the second base station.

When the first base station uses an intra-frequency handover or an inter-frequency handover, the first base station sends a handover preparation request to the second base station. After the second base station receives the handover preparation request, the first base station sends configuration information to the second base station, where the configuration information includes specific configuration information of the UE and radio resource control (RRC) protocol context information of the UE. Then, the first base station sends an RRC connection reconfiguration message to the UE, where the RRC connection reconfiguration message is used to instruct the UE to perform the handover, and the RRC connection reconfiguration message includes mobility control information and radio resource configuration information. After receiving the RRC connection reconfiguration information, the UE initiates a random access process to access the second base station.

When the first base station determines, by using the handover decision algorithm, that the measurement result corresponding to the second base station does not meet the requirement, the first base station does not need to start the handover operation, and therefore does not send the wake-up instruction to the second base station. It may be understood that in this embodiment, the first base station continues to provide a service for the UE.

In the method for assisting a terminal in measuring according to this embodiment of the present invention, a first base station receives a measurement result for a second base station and sent by UE, where the first base station provides a service for the UE; the first base station determines, according to the measurement result, whether a handover operation needs to be started; when the handover operation needs to be started, the first base station instructs the second base station to start up, and hands over the UE to the second base station for a service provided by the second base station. Compared with a problem in the prior art that after the UE sends an uplink signal, the second base station starts up according to the uplink signal, but a situation in which the UE does not enter a coverage scope of the second base station may occur, which causes a waste of resources, in this embodiment of the present invention, accurate determining may be implemented on a signal of the second base station to determine whether the second base station needs to start up to provide a service for the UE, thereby reducing an unnecessary resource waste of the second base station.

Figure 2:
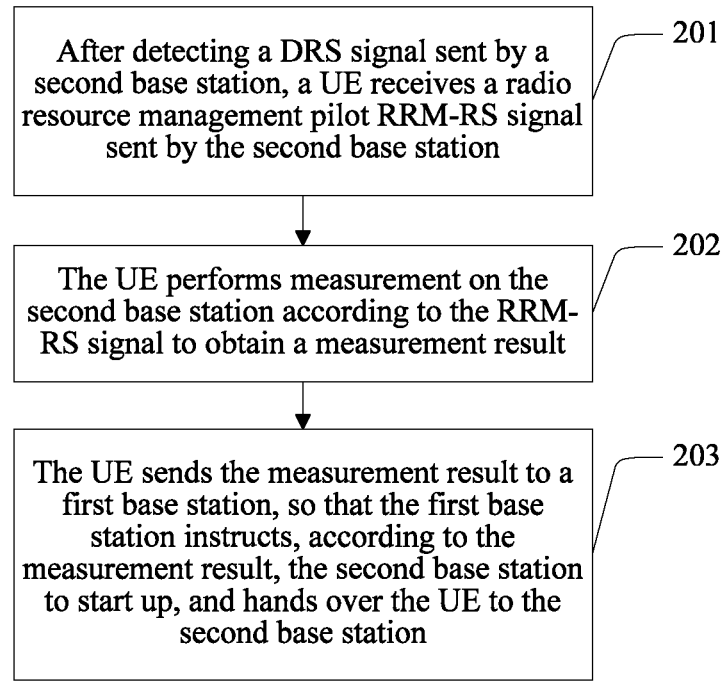
FIG. 2 is a flowchart of another method for assisting a terminal in measuring according to an embodiment of the present invention.

As shown in FIG. 2, an embodiment of the present invention provides another method for assisting a terminal in measuring, and the method is executed by UE. The method includes the following steps:

Step 201: After detecting a DRS signal sent by a second base station, the UE receives a radio resource management pilot (Radio Resource Management Reference Signal, RRM-RS) signal sent by the second base station.

The UE may be a cell phone (or referred to as a mobile phone), a portable, pocket-sized, handheld, computer-built-in, or in-vehicle mobile apparatus, or the like. The second base station may be a micro base station. The second base station has features such as low power, a small floor area, a small signal coverage scope, easy planning, and a capability of increasing a hotspot capacity. However, because the signal coverage scope is small, a change rate of the UE is relatively high, and a situation in which the UE is not served for a period of time may occur within the coverage scope of the second base station. In this case, the second base station may be disabled, which may be considered that the second base station enters a sleep state. In the sleep state, the second base station may reduce power and reduce interference to a neighboring cell. It should be noted that the second base station periodically sends a DRS signal in the sleep state. The DRS signal is a sparse synchronization signal in a time domain, and a time period is in seconds or longer. The DRS signal includes identity (ID) information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The DRS signal may be an existing synchronization signal, such as a primary synchronization signal (PSS) or a secondary synchronization signal (SSS); or the DRS signal may be a new discovery pilot (New Discovery Reference Signal, NDRS) signal that is newly defined by the second base station.

Specifically, the UE receives the RRM-RS signal according to content in the DRS signal. The RRM-RS signal may be a common pilot (Common Reference Signal, CRS) signal, or the RRM-RS signal may be a channel state information pilot (Channel State Information Reference Signal, CSI-RS) signal.

Optionally, before the second base station sends the RRM-RS signal, when the UE can receive the DRS signal, it indicates that the UE has entered the coverage scope of the second base station, or the UE is already at an edge of the coverage scope of the second base station. After receiving the DRS signal, the UE sends an uplink signal to the second base station on a carrier corresponding to the second base station, where the uplink signal is used to trigger the second base station to send the RRM-RS signal. After receiving the uplink signal, the second base station starts to send the RRM-RS signal. It should be noted that the uplink signal may be an uplink random access (Random Access Channel, RACH) signal, or the uplink signal may be an uplink sounding pilot (Sounding Reference Signal, SRS) signal. The RRM-RS signal includes channel information of the second base station, which is used to determine whether a signal of the second base station may serve the UE. The RRM-RS signal is a CRS signal, or the RRM-RS signal is a CSI-RS signal.

Step 202: The UE performs measurement on the second base station according to the RRM-RS signal to obtain a measurement result.

Optionally, the UE starts to receive the RRM-RS signal after waiting for a first predetermined time, and performs the measurement on the second base station to obtain the measurement result. It should be noted that the first predetermined time may be a time set by a timer on the UE; or optionally, after receiving a first control instruction sent by a first base station, the UE starts to receive the RRM-RS signal according to the first control instruction, and performs the measurement on the second base station to obtain the measurement result, where the first control instruction is used to instruct the UE to perform the measurement on the second base station; or optionally, after receiving a second control instruction sent by the second base station, the UE starts to receive the RRM-RS signal according to the second control instruction, and performs the measurement on the second base station to obtain the measurement result, where the second control instruction is used to instruct the UE to perform the measurement on the second base station.

When the RRM-RS signal is a CRS signal, the UE performs RRM measurement on the second base station according to the CRS signal to obtain a first measurement result, where the first measurement result includes RSRP and RSRQ; or when the RRM-RS signal is a CSI-RS signal, the UE performs RRM measurement on the second base station according to the CSI-RS signal to obtain a second measurement result, where the second measurement result includes CSI-RSRP.

Step 203: The UE sends the measurement result to a first base station, so that the first base station instructs, according to the measurement result, the second base station to start up, and hands over the UE to the second base station.

Specifically, the UE sends the RSRP and the RSRQ, or the CSI-RSRP to the first base station.

In the method for assisting a terminal in measuring according to this embodiment of the present invention, user equipment UE detects a discovery pilot DRS signal sent by a second base station; the UE receives a radio resource management pilot RRM-RS signal sent by the second base station; the UE performs measurement on the second base station according to the RRM-RS signal to obtain a measurement result; the UE sends the measurement result to a first base station, so that the first base station instructs, according to the measurement result, the second base station to start up, and hands over the UE to the second base station. Compared with a problem in the prior art that because a DRS signal is a sparse synchronization signal in a time domain, and a time period is in seconds or longer, the UE performs erroneous determining on a signal of the second base station, in this embodiment of the present invention, correct measurement on signal strength of a micro base station may be implemented, thereby preventing the UE from incorrectly determining the signal strength of the micro base station.

Figure 3:
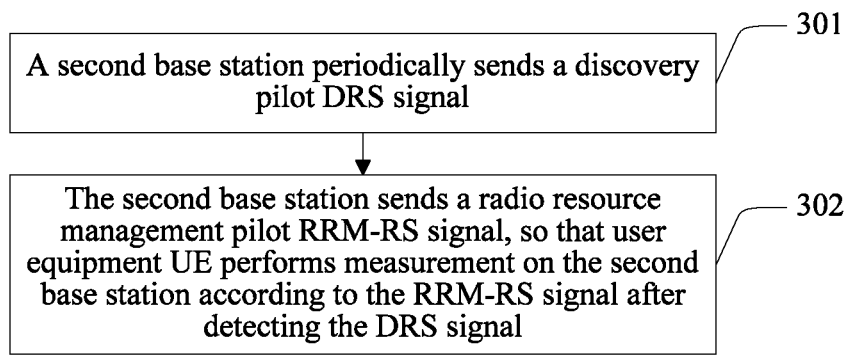
FIG. 3 is a flowchart of another method for assisting a terminal in measuring according to an embodiment of the present invention.

As shown in FIG. 3, an embodiment of the present invention provides another method for assisting a terminal in measuring, the method is executed by a second base station, and the second base station may specifically be a micro base station. The method includes the following steps:

Step 301: The second base station periodically sends a DRS signal.

As a micro base station, the second base station has features such as low power, a small floor area, a small signal coverage scope, easy planning, and a capability of increasing a hotspot capacity. However, because the signal coverage scope is small, a change rate of UE within the coverage scope is relatively high, and a situation in which the UE is not served for a period of time may occur within the coverage scope of the second base station. In this case, the second base station may be disabled, which may be considered that the second base station enters a sleep state, so as to reduce power and reduce interference to a neighboring cell. It should be noted that when the second base station is in the sleep state, the second base station may still periodically send a DRS signal. The DRS signal is a sparse synchronization signal in a time domain, and a time period is in seconds or longer. The DRS signal includes ID information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The second base station may reuse an existing synchronization signal, such as a PSS signal or an SSS signal; or the second base station may newly define a synchronization signal: an NDRS signal, and in this case, a sending period of the NDRS signal may be greater than or equal to a sending period of the existing synchronization signal. For example, the sending period of the existing synchronization signal may be 5 ms.

Step 302: The second base station sends an RRM-RS signal, so that UE performs measurement on the second base station according to the RRM-RS signal after detecting the DRS signal.

Optionally, the second base station starts to send the RRM-RS signal according to a received uplink signal sent by the UE, where the uplink signal may be a RACH signal, or the uplink signal may be an SRS signal. The uplink signal is used to trigger the second base station to send the RRM-RS signal. After the second base station receives the uplink signal sent by the UE, it may be considered that the second base station enters a semi-sleep state. In the semi-sleep state, the second base station starts to send the RRM-RS signal, where the RRM-RS signal may be a CRS signal, or the RRM-RS signal may be a CSI-RS signal, so that the UE performs the measurement on the second base station according to a different type of the RRM-RS signal.

Optionally, the second base station starts to send the RRM-RS signal according to a trigger instruction sent by a first base station, where the trigger instruction is used to trigger the second base station to send the RRM-RS signal. It may be understood that in this embodiment, the first base station is a macro base station, and in this case, is a base station that provides a service for the UE. Certainly, a type of the first base station is not limited in this embodiment.

Figure 4A:
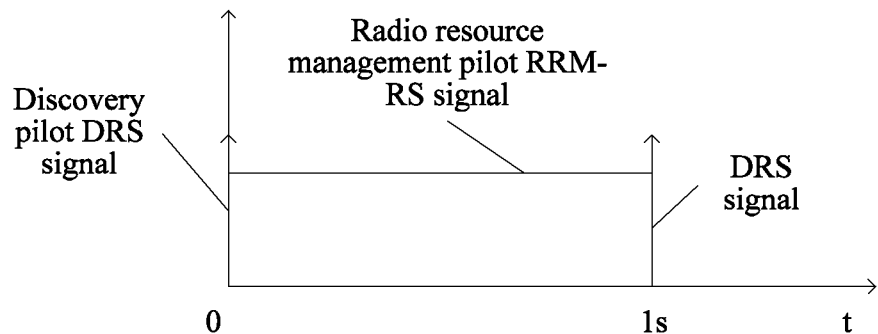
FIG. 4(a) is a schematic diagram of a period of sending a discovery pilot DRS signal and a pilot RS signal by a second base station according to an embodiment of the present invention.
Figure 4B:
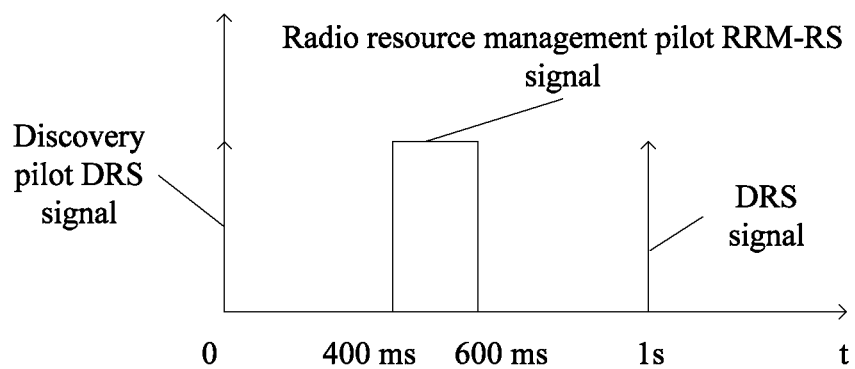
FIG. 4(b) is another schematic diagram of a period of sending a discovery pilot DRS signal and a pilot RS signal by a second base station according to an embodiment of the present invention.

Optionally, the second base station can send the RRM-RS signal without a need to receive the uplink signal sent by the UE or the trigger instruction sent by the first base station. Specifically, when the second base station is in the sleep state, after sending a DRS signal, the second base station sends the RRM-RS signal for a third predetermined time, and then continues to send a DRS signal in such a cycle, where the third predetermined time is a time within a period of sending the DRS signal except a time of sending the DRS signal or a predetermined time within a period of sending the DRS signal. For example, a period of sending the DRS signal by the second base station is used as an example for description. As shown in FIG. 4(a), the period of sending the DRS signal by the second base station is 1 s. After sending a DRS signal, the second base station starts to send an RRM-RS signal, and then continues to send a DRS signal; the second base station sends signals in this cycle. Alternatively, as shown in FIG. 4(b), the period of sending the DRS signal by the second base station is 1 s. After sending a DRS signal, the second base station sends an RRM-RS signal of 200 ms, and then the second base station enters a cycle of a next period to continue to send a DRS signal. It should be noted that for the RRM-RS signal of 200 ms sent between the two DRS signals, a start time of sending the RRM-RS signal by the second base station is not limited in this embodiment. For ease of description, in FIG. 4(b), the RRM-RS signal starts to be sent in 400 ms after the DRS signal is sent, that is, there is an interval of 400 ms between the RRM-RS signal and the two DRS signals.

In the method for assisting a terminal in measuring according to this embodiment of the present invention, a second base station periodically sends a discovery pilot DRS signal; the second base station sends a radio resource management pilot RRM-RS signal, so that user equipment UE receives the RRM-RS signal and performs measurement on the second base station according to the RRM-RS signal. Compared with a problem in the prior art that the second base station sends only the DRS signal, causing that UE incorrectly determines signal strength of the second base station, or the second base station sends both the DRS signal and the RRM-RS signal, causing a waste of resources, in this embodiment of the present invention, correct measurement on signal strength of a micro base station may be implemented, thereby preventing the UE from incorrectly determining the signal strength of the micro base station and achieving objectives of reducing power and reducing interference to a neighboring cell.

Figure 5:
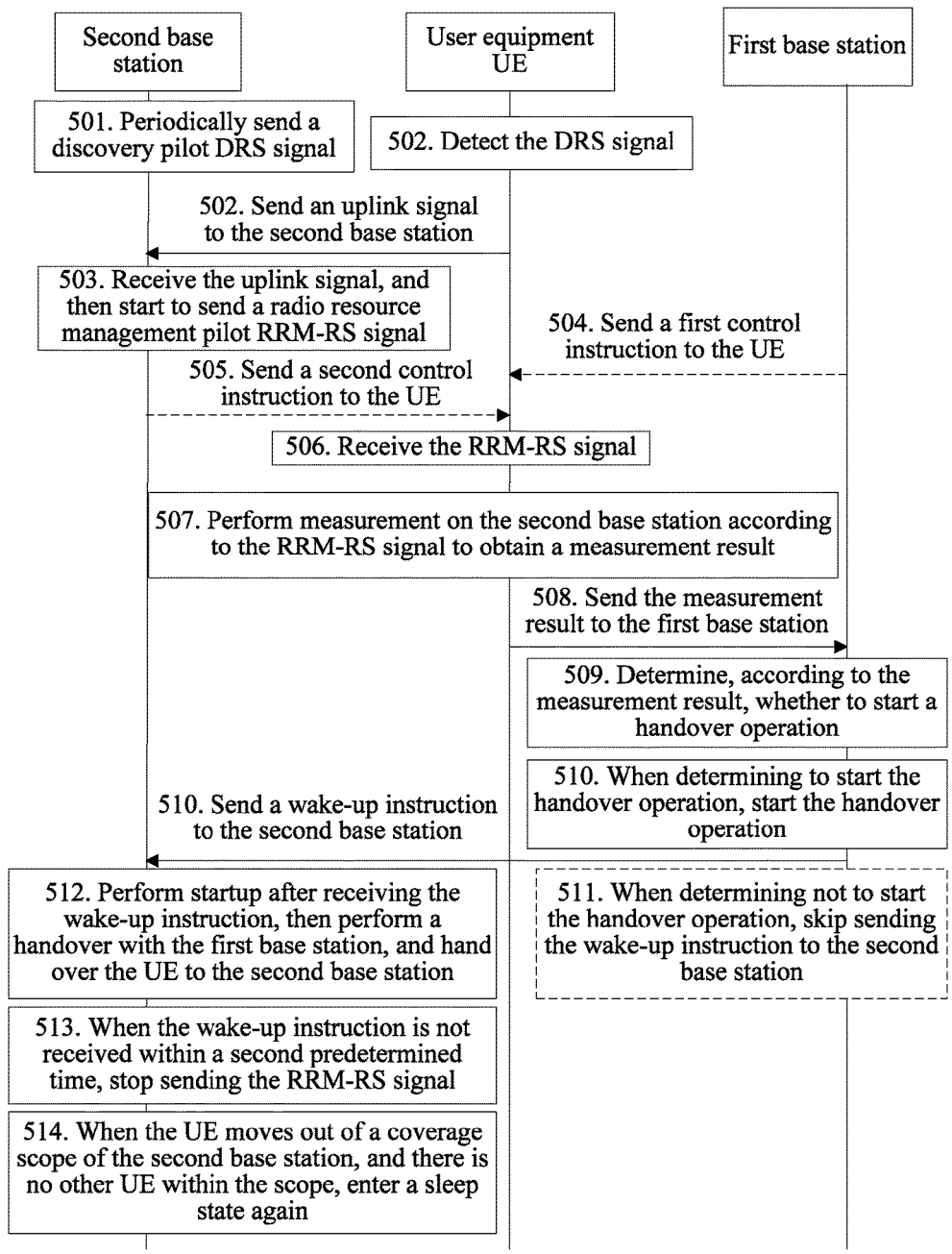
FIG. 5 is a flowchart of another method for assisting a terminal in measuring according to an embodiment of the present invention.

As shown in FIG. 5, an embodiment of the present invention provides another method for assisting a terminal in measuring, and the method includes the following steps:

Step 501: A second base station periodically sends a DRS signal.

In this embodiment, the second base station may be a micro base station. A situation in which UE is not served for a period of time may occur within a coverage scope of the second base station. In this case, the second base station may be disabled, which may be considered that the second base station enters a sleep state. In the sleep state, the second base station may reduce power and reduce interference to a neighboring cell. It should be noted that the second base station periodically sends a DRS signal in the sleep state. The DRS signal is a sparse synchronization signal in a time domain, and a time period is in seconds or longer. The DRS signal may reduce power of the second base station and reduce interference to a neighboring cell of the second base station. The DRS signal includes ID information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The second base station may reuse an existing synchronization signal, such as a PSS signal or an SSS signal; or the second base station may newly define a synchronization signal: an NDRS signal, and in this case, a sending period of the NDRS signal may be greater than or equal to a sending period of the existing synchronization signal. For example, the sending period of the existing synchronization signal may be 5 ms.

Step 502: After detecting the DRS signal, UE sends an uplink signal to the second base station.

When the UE can detect the DRS signal, it indicates that the UE has entered the coverage scope of the second base station, or the UE is already at an edge of the coverage scope of the second base station. After receiving the DRS signal, the UE sends the uplink signal to the second base station on a carrier corresponding to the second base station, where the uplink signal is used to trigger the second base station to send the RRM-RS signal. It should be noted that the uplink signal may be a RACH signal, or the uplink signal may be an SRS signal.

Step 503: The second base station receives the uplink signal sent by the UE and then starts to send an RRM-RS signal.

The RRM-RS signal may be a CRS signal, or the RRM-RS signal may be a CSI-RS signal. It should be noted that after the second base station receives the uplink signal, it may be considered that the second base station enters a semi-sleep state, that is, the second base station sends the RRM-RS signal in the semi-sleep state.

Step 504: The first base station sends a first control instruction to the UE.

In this embodiment, the first base station may be a macro base station. The macro base station has features such as a strong signal, a wide coverage scope, heavy traffic to bear, and a large floor area.

After the second base station sends the RRM-RS signal, the second base station interacts with the first base station by using an X2 interface or a base station controller (BSC), to notify the first base station that the RRM-RS signal has been sent. Then, the first base station generates the first control instruction and sends the first control instruction to the UE, where the first control instruction is used to instruct the UE to receive the RRM-RS signal. It may be understood that a manner of interaction between the first base station and the second base station is not limited in this embodiment. For ease of description, in this embodiment, a manner in which the interaction between the first base station and the second base station is performed by using an X2 interface or a BSC is used.

Step 505: The second base station sends a second control instruction to the UE.

After sending the RRM-RS signal, the second base station generates the second control instruction and then sends the second control instruction to the UE, where the second control instruction is used to instruct the UE to receive the RRM-RS signal.

It should be noted that either step 504 or step 505 is performed, and the two steps cannot be performed at the same time, or neither of the two steps may be performed at the same time. In FIG. 5, step 504 is indicated by a dashed line arrow, and step 505 is indicated by a dashed line arrow, where a dashed line arrow indicates that this step is an optional step. Certainly, an optional relationship may also be indicated in another manner, and a manner that indicates the optional relationship is not limited in this embodiment of the present invention.

Step 506: The UE receives the RRM-RS signal.

After the second base station sends the RRM-RS signal, optionally, the UE may directly receive the RRM-RS signal after detecting the DRS signal sent by the second base station; or the UE needs to wait a first predetermined time set by a timer on the UE and then starts to receive the RRM-RS signal after detecting the DRS signal sent by the second base station. For example, the first predetermined time may be in a unit of millisecond. For example, the first predetermined time may be 20 ms, or the first predetermined time may be 50 ms. Certainly, the time set by the timer on the UE is not limited in this embodiment. Alternatively, the UE starts to receive the RRM-RS signal after receiving the first control instruction sent by the first base station; or the UE starts to receive the RRM-RS signal after receiving the second control instruction sent by the second base station.

Step 507: The UE performs measurement on the second base station according to the RRM-RS signal to obtain a measurement result.

When the RRM-RS signal is a CRS signal, the UE performs RRM measurement on the second base station according to the CRS signal to obtain a first measurement result, where the first measurement result includes RSRP and RSRQ; or when the RRM-RS signal is a CSI-RS signal, the UE performs RRM measurement on the second base station according to the CSI-RS signal to obtain a second RRM measurement result, where the second measurement result includes CSI-RSRP.

Step 508: The UE sends the measurement result to the first base station.

Specifically, the UE sends the RSRP and the RSRQ, or CSI-RSRP to the first base station.

Step 509: The first base station determines, according to the measurement result, whether to start a handover operation.

The first base station may analyze the measurement result by using a handover decision algorithm to determine whether the first base station needs to start the handover operation. When a value of the RSRP in the first measurement result is greater than or equal to a threshold CH1, and when a value of the RSRQ is greater than or equal to a threshold CH2, the first base station determines to start the handover operation. On the contrary, when the value of the RSRP in the first measurement result is less than the threshold CH1, and/or when the value of the RSRQ is less than the threshold CH2, the first base station determines not to start the handover operation. Alternatively, when a value of the CSI-RSRP in the second measurement result is greater than or equal to a threshold CH1, the first base station determines to start the handover operation. On the contrary, when the value of the CSI-RSRP in the second measurement result is less than the threshold CH1, the first base station determines not to start the handover operation.

Step 510: When the first base station determines to start the handover operation, the first base station starts the handover operation and sends a wake-up instruction to the second base station.

When the first base station determines, by using the handover decision algorithm, that the first measurement result or the second measurement result corresponding to the second base station meets a requirement, in this case the first base station needs to start the handover operation and send the wake-up instruction to the second base station, where the wake-up instruction is used to instruct the second base station to start up. After the first base station sends the wake-up instruction to the second base station, step 512 continues to be performed.

Step 511: When determining not to start the handover operation, the first base station does not send the wake-up instruction to the second base station.

When the first base station determines, by using the handover decision algorithm, that the first measurement result or the second measurement result corresponding to the second base station does not meet the requirement, in this case the first base station does not need to start the handover operation and does not send the wake-up instruction to the second base station. It may be understood that in this embodiment, the first base station continues to provide a service for the UE. After the first base station determines not to start the handover operation, step 513 continues to be performed.

It should be noted that either step 510 or step 511 is performed, and the two steps cannot be performed at the same time. In FIG. 5, step 511 is indicated by a dashed box, or step 510 may be indicated by a dashed box, where a dashed box indicates that this step is an optional step. Certainly, an optional relationship may also be indicated in another manner, and a manner that indicates the optional relationship is not limited in this embodiment of the present invention.

Step 512: The second base station starts up after receiving the wake-up instruction; then, a handover is performed between the second base station and the first base station, and the UE is handed over to the second base station.

When the second base station starts up according to the wake-up instruction, it may be considered that the second base station enters an activated state.

When an intra-frequency handover or an inter-frequency handover is performed between the first base station and the second base station, the first base station sends a handover preparation request to the second base station. After the second base station receives the handover preparation request, the first base station sends configuration information to the second base station, where the configuration information includes specific configuration information of the UE and RRC context information of the UE. Then, the first base station sends an RRC connection reconfiguration message to the UE, where the RRC connection reconfiguration message is used to instruct the UE to perform the handover, and the RRC connection reconfiguration message includes mobility control information and radio resource configuration information. After receiving the RRC connection reconfiguration information, the UE initiates a random access process to access the second base station.

After the UE is handed over to a service scope of the second base station, step 514 continues to be performed.

Step 513: When the second base station does not receive the wake-up instruction within a second predetermined time, stop sending the RRM-RS signal.

In this embodiment, an entity for setting the second predetermined time is not limited. For example, the second predetermined time may be a time set by the second base station, or the second predetermined time may be a time set by the first base station. For example, when not starting the handover operation, the first base station may send a stop instruction to the second base station, where the stop instruction includes the second predetermined time. The second predetermined time may be in a unit of millisecond. For example, the second predetermined time may be 200 ms. In this embodiment, a range of the second predetermined time is not limited. After waiting the second predetermined time, when the second base station still does not receive the wake-up instruction sent by the first base station, the second base station enters the sleep state again, that is, the second base station sends only the DRS signal and stops sending the RRM-RS signal.

Step 514: When the UE moves out of a coverage scope of the second base station, and there is no other UE within the scope, the second base station enters a sleep state again.

When the UE moves out of the coverage scope of the second base station, a handover operation is performed between the second base station and a base station corresponding to a scope to be entered by the UE. When the UE enters a coverage scope of the first base station, a handover operation is directly performed between the second base station and the first base station; or when the UE enters a coverage scope of another micro base station, the second base station, the UE, and the micro base station continue to perform a procedure of step 501 to step 513.

When the UE moves out of the coverage scope of the second base station, and there is no other UE that needs to be served within the scope, the second base station enters the sleep state again.

In the method for assisting a terminal in measuring according to this embodiment of the present invention, correct measurement on signal strength of a micro base station may be implemented, thereby preventing UE from incorrectly determining the signal strength of the micro base station and achieving objectives of reducing power and reducing interference to a neighboring cell.

Figure 6:
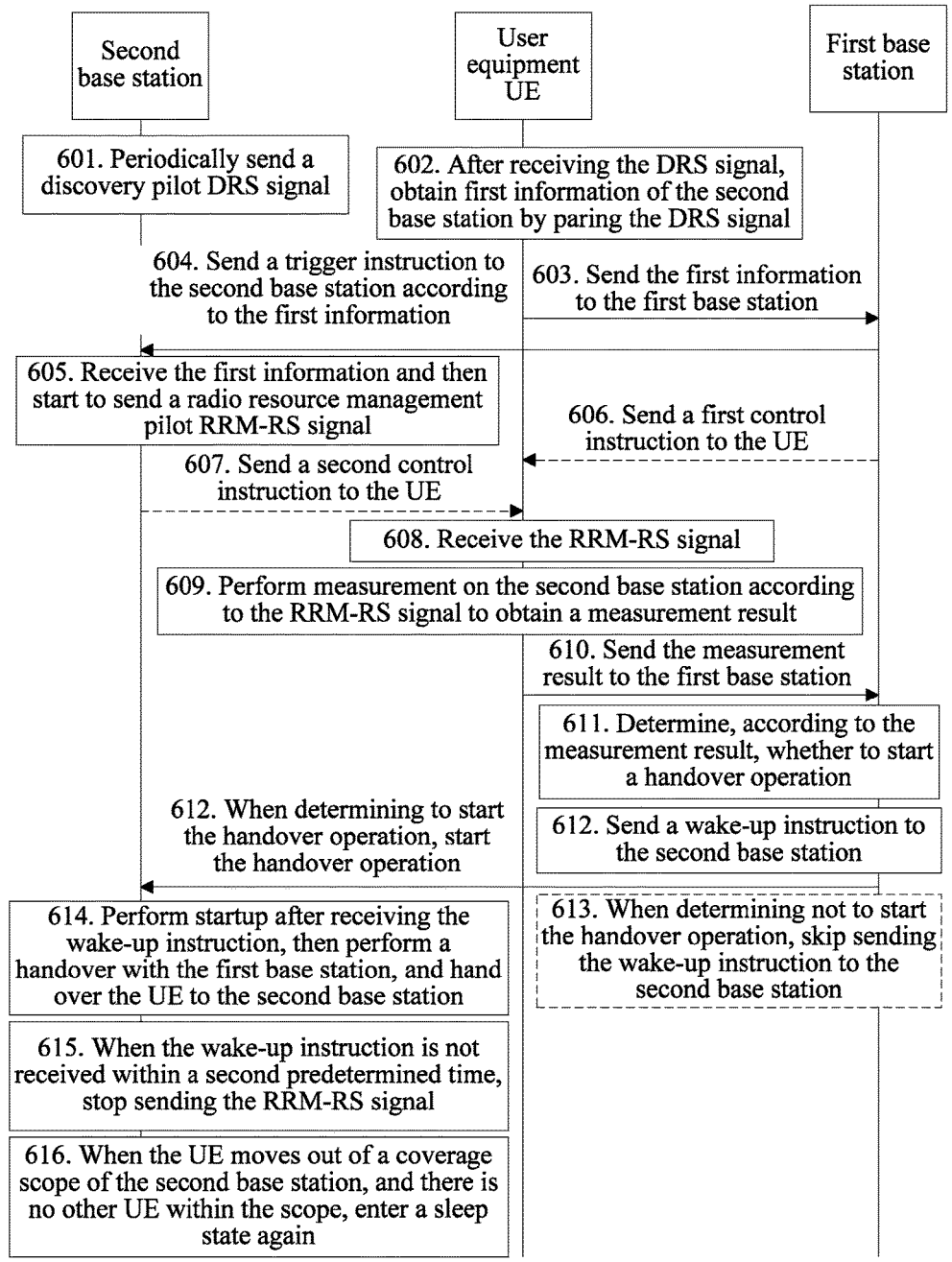
FIG. 6 is a flowchart of another method for assisting a terminal in measuring according to an embodiment of the present invention.

As shown in FIG. 6, an embodiment of the present invention provides another method for assisting a terminal in measuring, and the method includes the following steps:

Step 601: A second base station periodically sends a DRS signal.

In this embodiment, the second base station may be a micro base station. A situation in which UE is not served for a period of time may occur within a coverage scope of the second base station. In this case, the second base station may be disabled, which may be considered that the second base station enters a sleep state. In the sleep state, the second base station may reduce power and reduce interference to a neighboring cell. It should be noted that the second base station periodically sends a DRS signal in the sleep state. The DRS signal includes ID information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The second base station may reuse an existing synchronization signal, such as a PSS signal or an SSS signal; or the second base station may newly define a synchronization signal: an NDRS signal, and in this case, a sending period of the NDRS signal may be greater than or equal to a sending period of the existing synchronization signal. For example, the sending period of the existing synchronization signal may be 5 ms.

Step 602: After receiving the DRS signal, the UE obtains first information of the second base station by parsing the DRS signal.

The first information is used to instruct the first base station to trigger the second base station to send the RRM-RS signal. The UE may obtain the ID information of the cell formed by the second base station and the frequency channel number information of the second base station by parsing the DRS signal, that is, the first information includes the ID information formed by the second base station and the frequency channel number information of the second base station, where the ID information of the cell formed by the second base station includes the cell ID and/or the cell virtual ID.

Step 603: The UE sends the first information to a first base station.

The UE sends the first information to the first base station by using an air interface. In this embodiment, the first base station is a macro base station. The macro base station has features such as a strong signal, a wide coverage scope, heavy traffic to bear, and a large floor area.

Step 604: The first base station sends a trigger instruction to the second base station according to the first information.

The first base station sends the trigger instruction to the second base station by using an X2 interface or a BSC, where the trigger instruction is used to trigger the second base station to send the RRM-RS signal. It may be understood that a manner of interaction between the first base station and the second base station is not limited in this embodiment. For ease of description, in this embodiment, a manner in which the interaction between the first base station and the second base station is performed by using an X2 interface or a BSC is used.

Step 605: The second base station receives the trigger instruction and then starts to send an RRM-RS signal.

The RRM-RS signal may be a CRS signal, or the RRM-RS signal may be a CSI-RS signal. It should be noted that after the second base station receives the trigger instruction, it may be considered that the second base station enters a semi-sleep state, that is, the second base station sends the RRM-RS signal in the semi-sleep state.

Step 606: The first base station sends a first control instruction to the UE.

After the second base station sends the RRM-RS signal, the second base station interacts with the first base station by using an X2 interface or a BSC, to notify the first base station that the RRM-RS signal has been sent. Then, the first base station generates the first control instruction and sends the first control instruction to the UE, where the first control instruction is used to instruct the UE to receive the RRM-RS signal. It may be understood that a manner of interaction between the first base station and the second base station is not limited in this embodiment. For ease of description, in this embodiment, a manner in which the interaction between the first base station and the second base station is performed by using an X2 interface is used.

Step 607: The second base station sends a second control instruction to the UE.

After sending the RRM-RS signal, the second base station generates the second control instruction and then sends the second control instruction to the UE, where the second control instruction is used to instruct the UE to receive the RRM-RS signal.

It should be noted that either step 606 or step 607 is performed, and the two steps cannot be performed at the same time, or neither of the two steps may be performed at the same time. In FIG. 6, step 606 is indicated by a dashed line arrow, and step 607 is indicated by a dashed line arrow, where a dashed line arrow indicates that this step is an optional step. Certainly, an optional relationship may also be indicated in another manner, and a manner that indicates the optional relationship is not limited in this embodiment of the present invention.

Step 608: The UE receives the RRM-RS signal.

After the second base station sends the RRM-RS signal, optionally, the UE may directly receive the RRM-RS signal after detecting the DRS signal sent by the second base station; or the UE needs to wait a first predetermined time set by a timer on the UE and then starts to receive the RRM-RS signal after detecting the DRS signal sent by the second base station. The first predetermined time may be in a unit of millisecond. For example, the first predetermined time may be 20 ms. Certainly, the first predetermined time set by the timer on the UE is not limited in this embodiment. Alternatively, the UE starts to receive the RRM-RS signal after receiving the first control instruction sent by the first base station; or the UE starts to receive the RRM-RS signal after receiving the second control instruction sent by the second base station.

Step 609: The UE performs measurement on the second base station according to the RRM-RS signal to obtain a measurement result.

When the RRM-RS signal is a CRS signal, the UE performs RRM measurement on the second base station according to the CRS signal to obtain a first measurement result, where the first measurement result includes RSRP and RSRQ; or when the RRM-RS signal is a CSI-RS signal, the UE performs RRM measurement on the second base station according to the CSI-RS signal to obtain a second measurement result, where the second measurement result includes CSI-RSRP.

Step 610: The UE sends the measurement result to the first base station.

Specifically, the UE sends the RSRP and the RSRQ, or the CSI-RSRP to the first base station.

Step 611: The first base station determines, according to the measurement result, whether to start a handover operation.

The first base station may analyze the first measurement result or the second measurement result by using a handover decision algorithm to determine whether the first base station needs to start the handover operation. For a process of using the handover decision algorithm by the first base station, refer to detailed description of step 509 in FIG. 5, and details are not described herein again.

Step 612: When the first base station determines to start the handover operation, the first base station starts the handover operation and sends a wake-up instruction to the second base station.

When the first base station determines, by using the handover decision algorithm, that the first measurement result or the second measurement result corresponding to the second base station meets a requirement, in this case the first base station needs to start the handover operation and send the wake-up instruction to the second base station, where the wake-up instruction is used to instruct the second base station to start up. After the first base station sends the wake-up instruction to the second base station, step 614 continues to be performed.

Step 613: When determining not to start the handover operation, the first base station does not send the wake-up instruction to the second base station.

When the first base station determines, by using the handover decision algorithm, that the first measurement result or the second measurement result corresponding to the second base station does not meet the requirement, in this case the first base station does not need to start the handover operation and does not send the wake-up instruction to the second base station. It may be understood that in this embodiment, the first base station continues to provide a service for the UE. After the first base station determines not to start the handover operation, step 615 continues to be performed.

It should be noted that either step 612 or step 613 is performed, and the two steps cannot be performed at the same time. In FIG. 6, step 613 is indicated by a dashed box, or step 612 may be indicated by a dashed box, where a dashed box indicates that this step is an optional step. Certainly, an optional relationship may also be indicated in another manner, and a manner that indicates the optional relationship is not limited in this embodiment of the present invention.

Step 614: The second base station starts up after receiving the wake-up instruction; then, a handover is performed between the second base station and the first base station, and the UE is handed over to the second base station.

When the second base station starts up according to the wake-up instruction, it may be considered that the second base station enters an activated state.

For an operation process in which an intra-frequency handover or an inter-frequency handover is performed between the first base station and the second base station, refer to detailed description of step 512 in FIG. 5, and details are not described herein again.

After the UE is handed over to a service scope of the second base station, step 616 continues to be performed.

Step 615: When the second base station does not receive the wake-up instruction within a second predetermined time, stop sending the RRM-RS signal.

In this embodiment, an entity for setting the second predetermined time is not limited. For example, the second predetermined time may be a time set by the second base station, or the second predetermined time may be a time set by the first base station. For example, when not starting the handover operation, the first base station may send a stop instruction to the second base station, where the stop instruction includes the second predetermined time. In this embodiment, a range of the second predetermined time is not limited. After waiting the second predetermined time, when the second base station still does not receive the wake-up instruction sent by the first base station, the second base station enters the sleep state again, that is, the second base station sends only the DRS signal and stops sending the RRM-RS signal.

Step 616: When the UE moves out of a coverage scope of the second base station, and there is no other UE within the scope, the second base station enters a sleep state again.

When the UE moves out of the coverage scope of the second base station, a handover operation is performed between the second base station and a base station corresponding to a scope to be entered by the UE. When the UE enters a coverage scope of the first base station, a handover operation is directly performed between the second base station and the first base station; or when the UE enters a coverage scope of another micro base station, the second base station, the UE, and the micro base station continue to perform a procedure of step 601 to step 615.

In the method for assisting a terminal in measuring according to this embodiment of the present invention, correct measurement on signal strength of a micro base station may be implemented, thereby preventing UE from incorrectly determining the signal strength of the micro base station and achieving objectives of reducing power and reducing interference to a neighboring cell.

Figure 7:
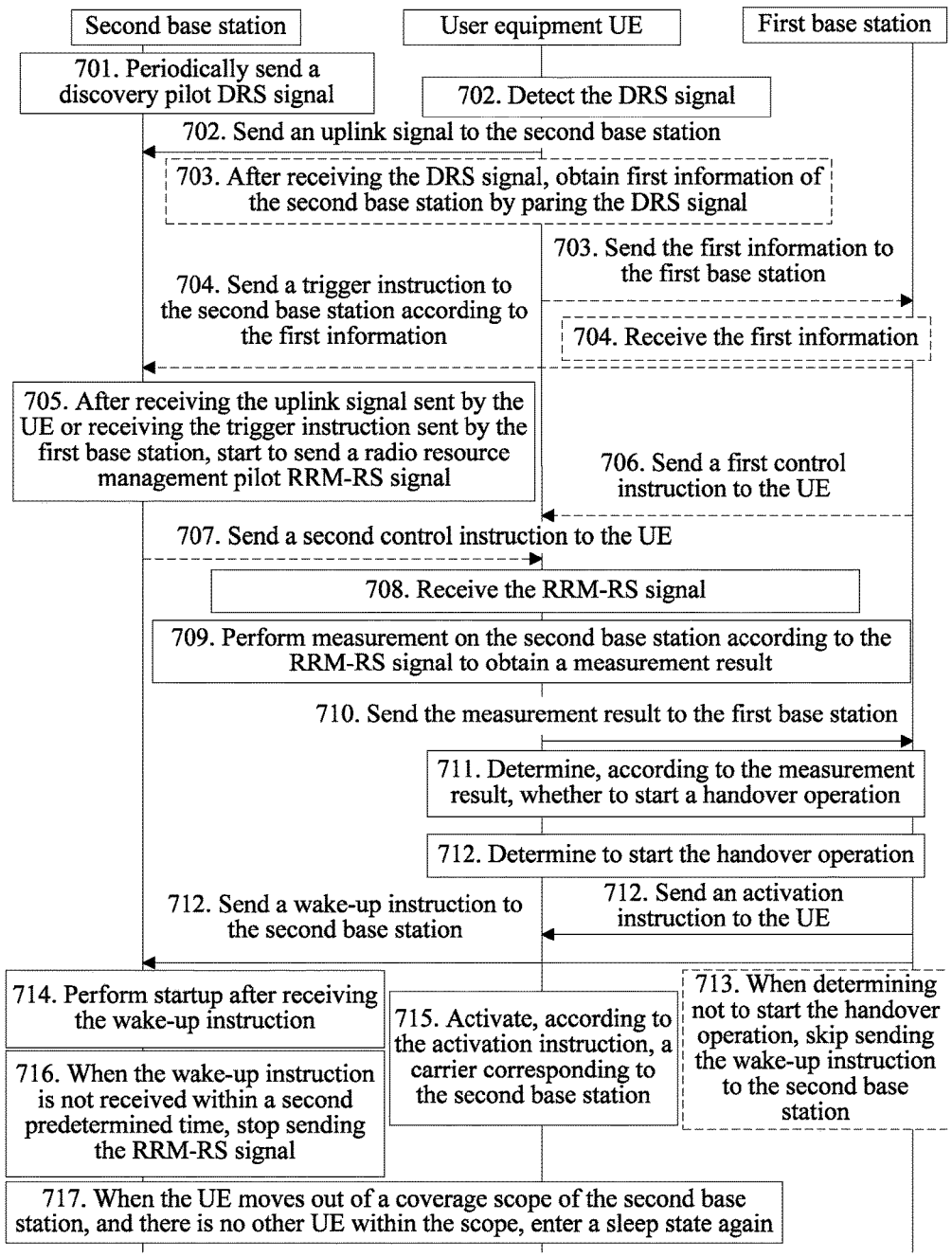
FIG. 7 is a flowchart of another method for assisting a terminal in measuring according to an embodiment of the present invention.

As shown in FIG. 7, an embodiment of the present invention provides another method for assisting a terminal in measuring, and the method includes the following steps:

Step 701: A second base station periodically sends a DRS signal.

In this embodiment, the second base station may be a micro base station. A situation in which UE is not served for a period of time may occur within a coverage scope of the second base station. In this case, the second base station may be disabled, which may be considered that the second base station enters a sleep state. In the sleep state, the second base station periodically sends a DRS signal. The DRS signal includes ID information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The second base station may reuse an existing synchronization signal, such as a PSS signal or an SSS signal; or the second base station may newly define a synchronization signal: an NDRS signal, and in this case, a sending period of the NDRS signal may be greater than or equal to a sending period of the existing synchronization signal. For example, the sending period of the existing synchronization signal may be 5 ms.

Step 702: After detecting the DRS signal, UE sends an uplink signal to the second base station.

When the UE can receive the DRS signal, it indicates that the UE has entered the coverage scope of the second base station, or the UE is already at an edge of the coverage scope of the second base station. After receiving the DRS signal, the UE sends the uplink signal to the second base station on a carrier corresponding to the second base station, where the uplink signal is used to trigger the second base station to send the RRM-RS signal. It should be noted that the uplink signal may be a RACH signal, or the uplink signal may be an SRS signal.

It should be noted that after the UE sends the uplink signal to the second base station, step 705 continues to be performed.

Step 703: After detecting the DRS signal, the UE obtains first information of the second base station by parsing the DRS signal and then sends the first information to a first base station.

In this embodiment, the first base station is a macro base station. The UE sends the first information to the first base station by using an air interface, and the first information is used to instruct the first base station to trigger the second base station to send the RRM-RS signal. The UE may obtain the ID information of the second base station and the frequency channel number information of the second base station by parsing the DRS signal, that is, the first information includes the ID information of the second base station and the frequency channel number information of the second base station. It may be understood that the UE sends the first information to the first base station by using an air interface.

It should be noted that either step 702 or step 703 is performed, and the two steps cannot be performed at the same time. In FIG. 7, step 703 and step 704 are indicated by dashed boxes, or step 702 may be indicated by a dashed box, where a dashed box indicates that this step is an optional step. Certainly, an optional relationship may also be indicated in another manner, and a manner that indicates the optional relationship is not limited in this embodiment of the present invention.

After the UE sends the first information to the first base station, step 704 continues to be performed.

Step 704: The first base station receives the first information and sends a trigger instruction to the second base station according to the first information.

The first base station sends the trigger instruction to the second base station by using an X2 interface or a BSC, where the trigger instruction is used to trigger the second base station to send the RRM-RS signal. It may be understood that a manner of interaction between the first base station and the second base station is not limited in this embodiment. For ease of description, in this embodiment, a manner in which the interaction between the first base station and the second base station is performed by using an X2 interface or a BSC is used.

Step 705: After receiving the uplink signal sent by the UE or receiving the trigger instruction sent by the first base station, the second base station starts to send an RRM-RS signal.

The RRM-RS signal may be a CRS signal, or the RRM-RS signal may be a CSI-RS signal. It should be noted that after the second receives the uplink signal sent by the UE or after the second base station receives the trigger instruction sent by the first base station, it may be considered that the second base station enters a semi-sleep state, that is, the second base station sends the RRM-RS signal in the semi-sleep state.

Step 706: The first base station sends a first control instruction to the UE.

After the second base station sends the RRM-RS signal, the second base station interacts with the first base station by using an X2 interface or a BSC, to notify the first base station that the RRM-RS signal has been sent. Then, the first base station generates the first control instruction and sends the first control instruction to the UE, where the first control instruction is used to instruct the UE to receive the RRM-RS signal. It may be understood that a manner of interaction between the first base station and the second base station is not limited in this embodiment. For ease of description, in this embodiment, a manner in which the interaction between the first base station and the second base station is performed by using an X2 interface is used.

Step 707: The second base station sends a second control instruction to the UE.

After sending the RRM-RS signal, the second base station generates the second control instruction and then sends the second control instruction to the UE, where the second control instruction is used to instruct the UE to receive the RRM-RS signal.

It should be noted that either step 706 or step 707 is performed, and the two steps cannot be performed at the same time, or neither of the two steps may be performed at the same time. In FIG. 7, step 706 is indicated by a dashed line arrow, and step 707 is indicated by a dashed line arrow, where a dashed line arrow indicates that this step is an optional step. Certainly, an optional relationship may also be indicated in another manner, and a manner that indicates the optional relationship is not limited in this embodiment of the present invention.

Step 708: The UE receives the RRM-RS signal.

After the second base station sends the RRM-RS signal, optionally, the UE may directly receive the RRM-RS signal; or the UE needs to wait a first predetermined time set by a timer on the UE and then starts to receive the RRM-RS signal. The first predetermined time may be in a unit of millisecond. For example, a unit of the first predetermined time may be 50 ms. Certainly, the first predetermined time set by the timer on the UE is not limited in this embodiment. Alternatively, the UE starts to receive the RRM-RS signal after receiving the first control instruction sent by the first base station; or the UE starts to receive the RRM-RS signal after receiving the second control instruction sent by the second base station.

Step 709: The UE performs measurement on the second base station according to the RRM-RS signal to obtain a measurement result.

When the RRM-RS signal is a CRS signal, the UE performs RRM measurement on the second base station according to the CRS signal to obtain a first measurement result, where the first measurement result includes RSRP and RSRQ; or when the RRM-RS signal is a CSI-RS signal, the UE performs RRM measurement on the second base station according to the CSI-RS signal to obtain a second measurement result, where the second measurement result includes CSI-RSRP.

Step 710: The UE sends the measurement result to the first base station.

Specifically, the UE sends the RSRP and the RSRQ, or the CSI-RSRP to the first base station.

Step 711: The first base station determines, according to the measurement result, whether to start up the second base station.

The first base station may analyze the first measurement result or the second measurement result by using a handover decision algorithm to determine whether the first base station needs to start a handover operation. For a process of using the handover decision algorithm by the first base station, refer to detailed description of step 509 in FIG. 5, and details are not described herein again.

Step 712: When determining to start up the second base station, the first base station sends a wake-up instruction to the second base station and sends an activation instruction to the UE.

When the first base station determines, by using the handover decision algorithm, that the first measurement result or the second measurement result corresponding to the second base station meets a requirement, in this case the first base station sends the wake-up instruction to the second base station, where the wake-up instruction is used to instruct the second base station to start up.

It should be noted that the UE in this embodiment is UE that supports carrier aggregation, where the UE that supports carrier aggregation may support services of two carriers at the same time. For example, when the UE keeps being connected to the first base station, the carrier corresponding to the second base station may be used as a secondary component carrier. When the UE is at an edge of the coverage scope of the second base station, the first base station may send the activation instruction to the UE, where the activation instruction is used by the UE to activate the carrier corresponding to the second base station.

It should be noted that after the first base station sends the wake-up instruction to the second base station and sends the activation instruction to the UE, step 714 and/or step 715 continue/continues to be performed.

Step 713: When determining not to start up the second base station, the first base station does not send the wake-up instruction to the second base station and does not send the activation instruction to the UE.

When the first base station determines, by using the handover decision algorithm, that the first measurement result or the second measurement result corresponding to the second base station does not meet the requirement, in this case the first base station does not send the wake-up instruction to the second base station and does not send the activation instruction to the UE. It may be understood that in this embodiment, the first base station continues to provide a service for the UE. After the first base station determines not to start up the second base station, step 716 continues to be performed.

It should be noted that either step 712 or step 713 is performed, and the two steps cannot be performed at the same time. In FIG. 7, step 713 is indicated by a dashed box, or step 712 may be indicated by a dashed box, where a dashed box indicates that this step is an optional step. Certainly, an optional relationship may also be indicated in another manner, and a manner that indicates the optional relationship is not limited in this embodiment of the present invention.

Step 714: The second base station starts up after receiving the wake-up instruction.

When the second base station starts up according to the wake-up instruction, it may be considered that the second base station enters an activated state.

Step 715: The UE activates, according to the activation instruction, a carrier corresponding to the second base station.

After the UE activates the carrier corresponding to the second base station according to the activation instruction sent by the first base station, the second base station may provide a service for the UE.

It should be noted that there is no order between step 714 and step 715. Certainly, step 715 may be performed first, and then step 714 is performed; or step 714 and step 715 are performed at the same time.

Step 716: When the second base station does not receive the wake-up instruction within a second predetermined time, stop sending the RRM-RS signal.

In this embodiment, an entity for setting the second predetermined time is not limited. For example, the second predetermined time may be a time set by the second base station, or the second predetermined time may be a time set by the first base station. For example, when not starting the handover operation, the first base station may send a stop instruction to the second base station, where the stop instruction includes the second predetermined time. The second predetermined time may be in a unit of millisecond. For example, the second predetermined time may be 200 ms. In this embodiment, a range of the second predetermined time is not limited. After waiting the second predetermined time, when the second base station still does not receive the wake-up instruction sent by the first base station, the second base station enters the sleep state again, that is, the second base station sends only the DRS signal and stops sending the RRM-RS signal.

Step 717: When the UE moves out of a coverage scope of the second base station, and there is no other UE within the scope, the second base station enters a sleep state again.

When the UE moves out of the coverage scope of the second base station, a handover operation is performed between the second base station and a base station corresponding to a scope to be entered by the UE. When the UE enters a coverage scope of the first base station, a handover operation is directly performed between the second base station and the first base station; or when the UE enters a coverage scope of another micro base station, the second base station, the UE, and the micro base station continue to perform a procedure of step 701 to step 716.

In the method for assisting a terminal in measuring according to this embodiment of the present invention, correct measurement on signal strength of a micro base station may be implemented, thereby preventing UE from incorrectly determining the signal strength of the micro base station and achieving objectives of reducing power and reducing interference to a neighboring cell.

Figure 8:
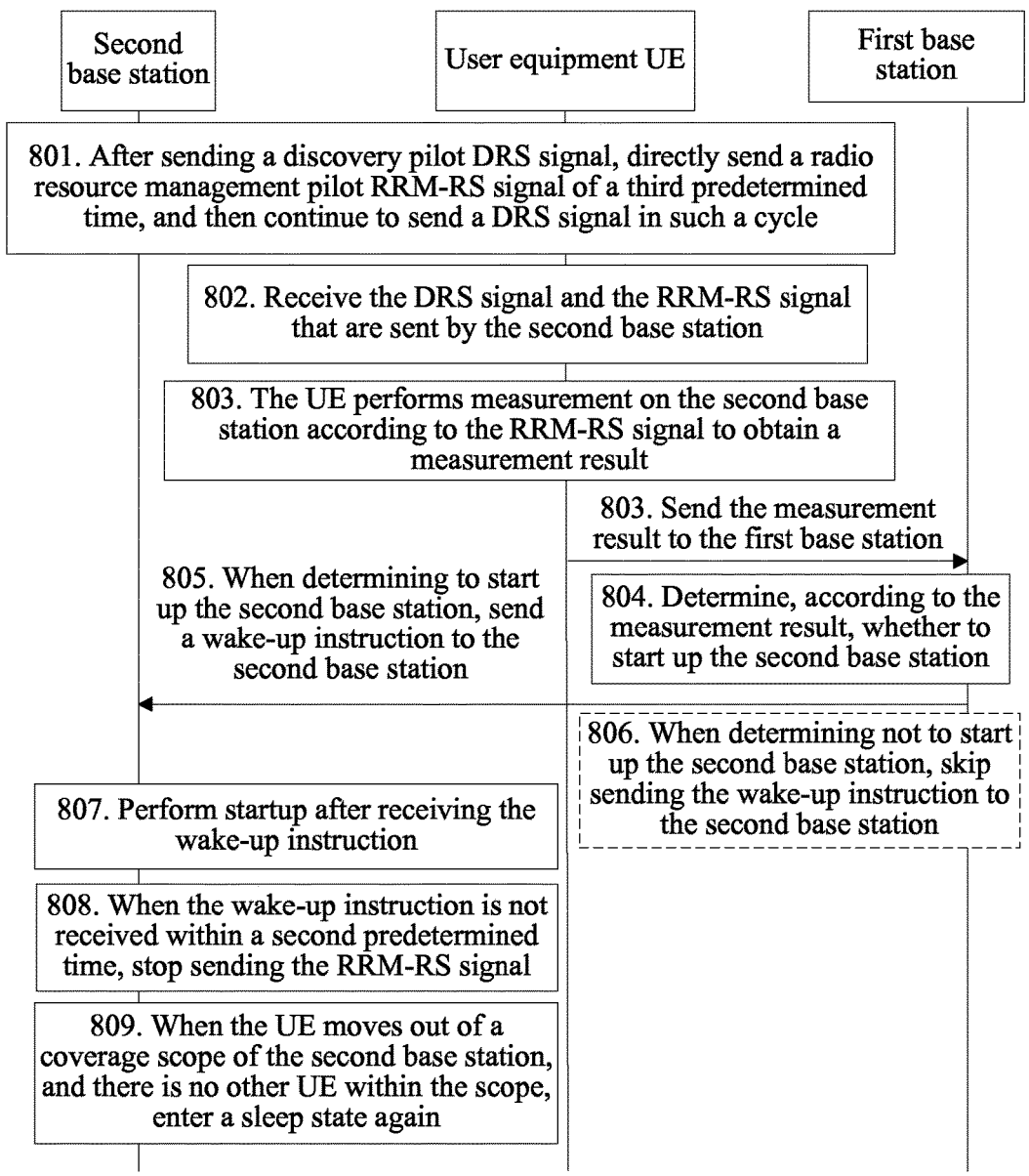
FIG. 8 is a flowchart of another method for assisting a terminal in measuring according to an embodiment of the present invention.

As shown in FIG. 8, an embodiment of the present invention provides another method for assisting a terminal in measuring, and the method includes the following steps:

Step 801: After sending a DRS signal, a second base station sends an RRM-RS signal for a third predetermined time, and then continues to send a DRS signal in such a cycle.

In this embodiment, the second base station may be a micro base station. In this case, it may be considered that the second base station enters a sleep state. In the sleep state, the second base station periodically sends a DRS signal and an RRM-RS signal. The DRS signal includes ID information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The second base station may reuse an existing synchronization signal, such as a PSS signal or an SSS signal; or the second base station may newly define a synchronization signal: an NDRS signal, and in this case, a sending period of the NDRS signal may be greater than or equal to a sending period of the existing synchronization signal. For example, the sending period of the existing synchronization signal may be 5 ms. The RRM-RS signal may be a CRS signal, or the RRM-RS signal may be a CSI-RS signal.

The third predetermined time is a time within a period of sending the DRS signal except a time of sending the DRS signal or a predetermined time within a period of sending the DRS signal. For example, a period of sending the DRS signal by the second base station is used as an example for description. As shown in FIG. 4(*a*), the period of sending the DRS signal by the second base station is 1 s. After sending a DRS signal, the second base station starts to send an RRM-RS signal, and then continues to send a DRS signal; the second base station sends signals in this cycle. Alternatively, as shown in FIG. 4(*b*), the period of sending the DRS signal by the second base station is 1 s. After sending a DRS signal, the second base station sends an RRM-RS signal of 200 ms, and then the second base station enters a cycle of a next period to continue to send a DRS signal. It should be noted that for the RRM-RS signal of 200 ms sent between the two DRS signals, a start time of sending the RRM-RS signal by the second base station is not limited in this embodiment. For ease of description, in FIG. 4(*b*), the RS signal starts to be sent in 400 ms after the DRS signal is sent, that is, there is an interval of 400 ms between the RRM-RS signal and the two DRS signals.

Step 802: UE receives the DRS signal and the RRM-RS signal that are sent by the second base station.

After the second base station sends the RRM-RS signal, optionally, the UE may directly receive the RRM-RS signal after detecting the DRS signal sent by the second base station; or the UE needs to wait a first predetermined time set by a timer on the UE and then starts to receive the RRM-RS signal after detecting the DRS signal sent by the second base station. The first predetermined time may be in a unit of millisecond. For example, the first predetermined time may be 20 ms. Certainly, the time set by the timer on the UE is not limited in this embodiment. Alternatively, the UE starts to receive the RRM-RS signal after receiving a first control instruction sent by a first base station; or the UE starts to receive the RRM-RS signal after receiving a second control instruction sent by the second base station.

It should be noted that for description of the first control instruction and the second control instruction in this step, refer to FIG. 5, and details are not described herein again.

Step 803: The UE performs measurement on the second base station according to the RRM-RS signal to obtain a measurement result and sends the measurement result to a first base station.

When the RRM-RS signal is a CRS signal, the UE performs RRM measurement on the second base station according to the CRS signal to obtain a first measurement result, where the first measurement result includes RSRP and RSRQ; or when the RRM-RS signal is a CSI-RS signal, the UE performs RRM measurement on the second base station according to the CSI-RS signal to obtain a second measurement result, where the second measurement result includes CSI-RSRP. Then, the UE sends the RSRP and the RSRQ, or the CSI-RSRP to the first base station.

Step 804: The first base station determines, according to the measurement result, whether the second base station needs to start up.

The first base station may analyze the first measurement result or the second measurement result by using a handover decision algorithm to determine whether the first base station needs to start a handover operation. For a process of using the handover decision algorithm by the first base station, refer to detailed description of step 509 in FIG. 5, and details are not described herein again.

Step 805: When determining to start up the second base station, the first base station sends a wake-up instruction to the second base station.

When the first base station determines, by using the handover decision algorithm, that the first measurement result or the second measurement result corresponding to the second base station meets a requirement, in this case the first base station starts the handover operation and sends the wake-up instruction to the second base station, where the wake-up instruction is used to instruct the second base station to start up.

Optionally, when the UE is UE that supports carrier aggregation, the first base station sends the wake-up instruction to the second base station and sends an activation instruction to the UE, so that the UE activates, according to the activation instruction, a carrier corresponding to the second base station. The UE that supports carrier aggregation may support services of two carriers at the same time. After the first base station determines to start up the second base station, step 807 continues to be performed.

Step 806: When the first base station does not need to start up the second base station, the first base station does not send the wake-up instruction to the second base station.

When the first base station determines, by using the handover decision algorithm, that the first measurement result or the second measurement result corresponding to the second base station does not meet the requirement, in this case the first base station does not send the wake-up instruction to the second base station, and optionally, when the UE is UE that supports carrier aggregation, the first base station does not send the activation instruction to the UE. It may be understood that in this embodiment, the first base station continues to provide a service for the UE. After the first base station determines not to start up the second base station, step 808 continues to be performed.

It should be noted that either step 805 or step 806 is performed, and the two steps cannot be performed at the same time. In FIG. 8, step 806 is indicated by a dashed box, or step 805 may be indicated by a dashed box, where a dashed box indicates that this step is an optional step. Certainly, an optional relationship may also be indicated in another manner, and a manner that indicates the optional relationship is not limited in this embodiment of the present invention.

Step 807: The second base station starts up after receiving the wake-up instruction.

When the second base station starts up according to the wake-up instruction, it may be considered that the second base station enters an activated state.

The handover operation is performed between the second base station in the activated state and the first base station, where the handover operation may be an intra-frequency handover operation, or the handover operation may be an inter-frequency handover operation. For description of the intra-frequency handover operation or the inter-frequency handover operation, refer to detailed description of step 509 in FIG. 5, and details are not described herein again.

Optionally, when the UE is UE that supports carrier aggregation, the UE activates, according to the activation instruction sent by the first base station, the carrier corresponding to the second base station, so that the second base station can provide a service for the UE.

After the second base station serves the UE, step 809 continues to be performed.

Step 808: When the second base station does not receive the wake-up instruction within a second predetermined time, stop sending the RRM-RS signal.

In this embodiment, an entity for setting the second predetermined time is not limited. For example, the second predetermined time may be a time set by the second base station, or the second predetermined time may be a time set by the first base station. In this embodiment, a range of the second predetermined time is not limited. After waiting the second predetermined time, when the second base station still does not receive the wake-up instruction sent by the first base station, the second base station enters the sleep state again, that is, the second base station sends only the DRS signal and stops sending the RRM-RS signal.

Step 809: When the UE moves out of a coverage scope of the second base station, and there is no other UE within the scope, the second base station enters a sleep state again.

When the UE moves out of the coverage scope of the second base station, a handover operation is performed between the second base station and a base station corresponding to a scope to be entered by the UE. When the UE enters a coverage scope of the first base station, a handover operation is directly performed between the second base station and the first base station; or when the UE enters a coverage scope of another micro base station, the second base station, the UE, and the micro base station continue to perform a procedure of step 801 to step 808.

In the method for assisting a terminal in measuring according to this embodiment of the present invention, correct measurement on signal strength of a micro base station may be implemented, thereby preventing UE from incorrectly determining the signal strength of the micro base station and achieving objectives of reducing power and reducing interference to a neighboring cell.

Figure 9:
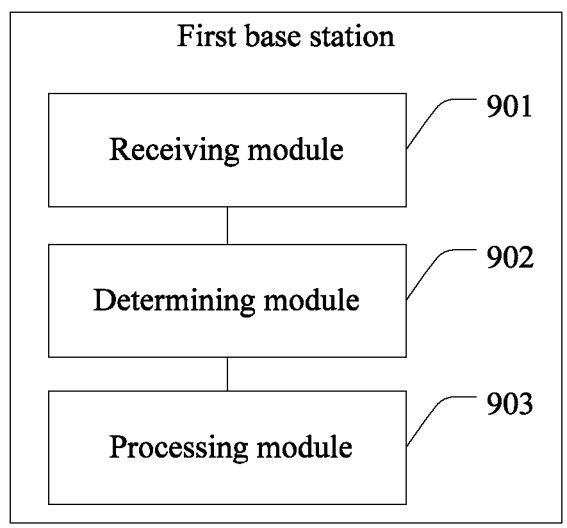
FIG. 9 is a block diagram of an apparatus for assisting a terminal in measuring according to an embodiment of the present invention.

As shown in FIG. 9, an embodiment of the present invention provides an apparatus for assisting a terminal in measuring, including: a receiving module 901, a determining module 902, and a processing module 903. The apparatus may be a first base station, and the first base station may be a macro base station.

The receiving module 901 is configured to receive a measurement result for a second base station and sent by UE, where the first base station provides a service for the UE; and provide the measurement result for the determining module 902.

The second base station is a micro base station. The macro base station has a strong signal, a wide coverage scope, heavy traffic to bear, and a large floor area; the micro base station has low power, a small floor area, a small signal coverage scope, easy planning, and a capability of increasing a hotspot capacity. The measurement result of the second base station includes RSRP and RSRQ.

The determining module 902 is configured to determine, according to the measurement result received by the receiving module 901, whether a handover operation needs to be started, and provide a result of the determining for the processing module 903.

The determining module 902 may analyze the measurement result by using a handover decision algorithm to determine whether the processing module 903 needs to start the handover operation. When a value of the RSRP in the measurement result is greater than or equal to a threshold CH1, and when a value of the RSRQ is greater than or equal to a threshold CH2, the processing module 903 determines to start the handover operation. On the contrary, when the value of the RSRP in the measurement result is less than the threshold CH1, and/or when the value of the RSRQ is less than the threshold CH2, the processing module 903 determines not to start the handover operation.

The processing module 903 is configured to: instruct, according to the result determined by the determining module 902 that the handover operation needs to be started, the second base station to start up, and hand over the UE to the second base station for a service provided by the second base station.

When the determining module 902 determines, by using the handover decision algorithm, that the measurement result corresponding to the second base station meets a requirement, in this case the processing module 903 starts the handover operation and sends a wake-up instruction to the second base station, where the wake-up instruction is used to instruct the second base station to start up.

Figure 10:
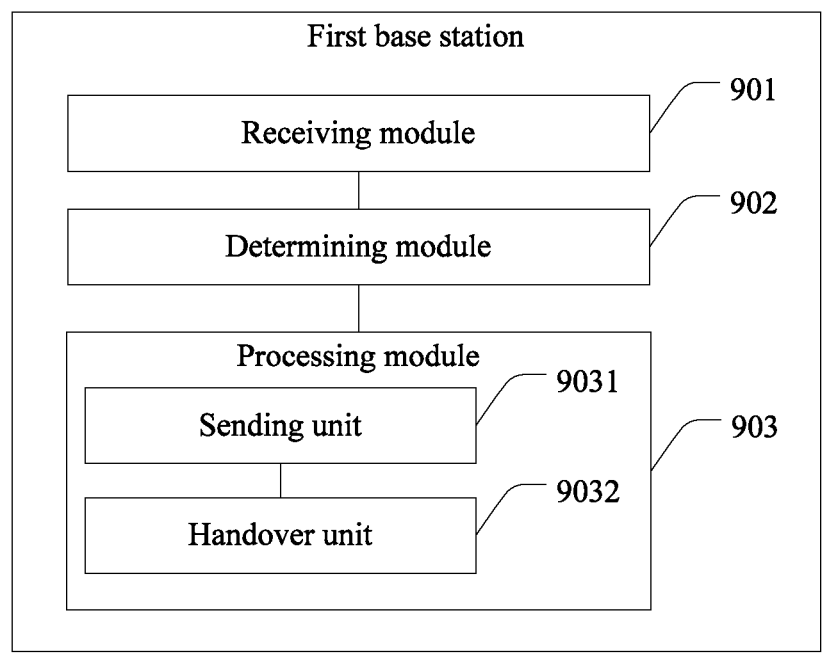
FIG. 10 is a block diagram of another apparatus for assisting a terminal in measuring according to an embodiment of the present invention.

Further, as shown in FIG. 10, the processing module 903 of the apparatus includes a sending unit 9031 and a handover unit 9032.

The sending unit 9031 sends the wake-up instruction to the second base station according to the result determined by the determining module 902 that the handover operation needs to be started.

After the sending unit 9031 sends the wake-up instruction to the second base station, the handover unit 9032 is configured to hand over the UE to the second base station after the second base station starts up.

Optionally, the processing module 903 is further configured to skip sending the wake-up instruction to the second base station according to the result determined by the determining module that the handover operation does not need to be started.

It should be noted that when the UE is UE that supports carrier aggregation, the determining module 902 determines, according to the measurement result received by the receiving module 901, whether an activation instruction needs to be sent to the UE that supports carrier aggregation, so that the UE activates, according to the activation instruction, a carrier corresponding to the second base station.

It should be noted that because content such as specific implementation processes of various modules and information exchange between the various modules in the apparatus shown in FIG. 9 and FIG. 10 is based on a same invention concept as the method embodiments of the present invention, refer to the method embodiments, and details are not described herein again.

In the apparatus for assisting a terminal in measuring according to this embodiment of the present invention, a receiving module receives a measurement result for a second base station sent by user equipment UE, where the first base station provides a service for the UE, and the receiving module provides the measurement result for a determining module; the determining module determines, according to the measurement result received by the receiving module, whether a handover operation needs to be started, and provides a result of the determining for a processing module; the processing module instructs, according to the result determined by the determining module that the handover operation needs to be started, the second base station to start up, and hands over the UE to the second base station for a service provided by the second base station. Compared with a problem in the prior art that after the UE sends an uplink signal, the second base station starts up according to the uplink signal, but a situation in which the UE does not enter a coverage scope of the second base station may occur, which causes a waste of resources, in this embodiment of the present invention, accurate determining may be implemented on a signal of the second base station to determine whether the second base station needs to start up to provide a service for the UE, thereby reducing an unnecessary resource waste of the second base station.

Figure 11:
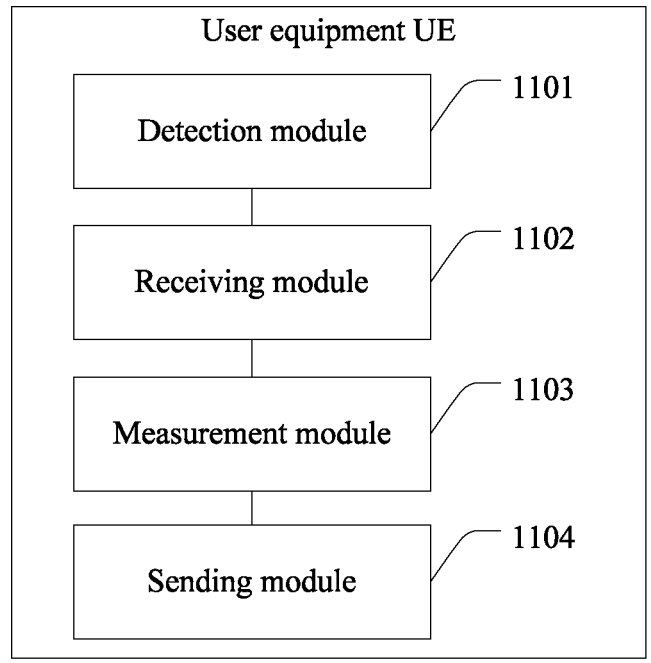
FIG. 11 is a block diagram of another apparatus for assisting a terminal in measuring according to an embodiment of the present invention.

As shown in FIG. 11, an embodiment of the present invention provides another apparatus for assisting a terminal in measuring, including: a detection module 1101, a receiving module 1102, a measurement module 1103, and a sending module 1104; the apparatus may be UE.

The detection module 1101 is configured to detect a DRS signal sent by a second base station.

In this embodiment, the second base station may be a micro base station. The micro base station has features such as low power, a small floor area, a small signal coverage scope, easy planning, and a capability of increasing a hotspot capacity.

The receiving module 1102 is configured to: after the detection module 1101 detects the DRS signal, receive an RRM-RS signal sent by the second base station, and provide the RRM-RS signal for the measurement module 1103.

The RRM-RS signal may be a CRS signal, or the RRM-RS signal may be a CSI-RS signal.

After the receiving module 1102 receives the RRM-RS signal, the measurement module 1103 is configured to perform, according to the RRM-RS signal received by the receiving module 1101, measurement on the second base station to obtain a measurement result, and provide the measurement result for the sending module 1104.

When the RRM-RS signal is a CRS signal, the UE performs RRM measurement on the second base station according to the CRS signal to obtain a first measurement result, where the first measurement result includes RSRP and RSRQ; or when the RRM-RS signal is a CSI-RS signal, the UE performs RRM measurement on the second base station according to the CSI-RS signal to obtain a second RRM measurement result, where the second measurement result includes CSI-RSRP.

After the measurement module 1103 obtains the measurement result, the sending module 1104 is configured to send the first measurement result or the second measurement result obtained by the measurement module 1103 to a first base station, so that the first base station determines, according to the first measurement result or the second measurement result, whether to instruct the second base station to start up, and hands over the UE to the second base station.

Specifically, the sending module 1104 sends the RSRP and the RSRQ, or the CSI-RSRP to the first base station.

Figure 12:
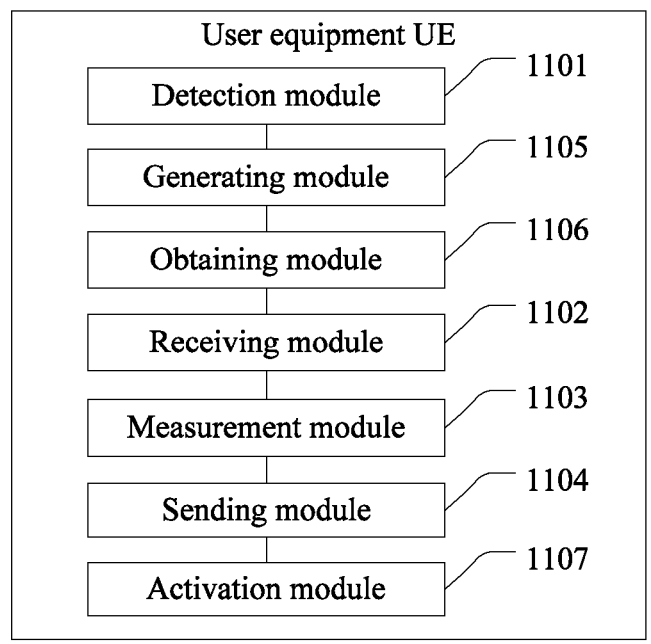
FIG. 12 is a block diagram of another apparatus for assisting a terminal in measuring according to an embodiment of the present invention.

Further, as shown in FIG. 12, the apparatus further includes a generating module 1105, an obtaining module 1106, and an activation module 1107.

The detection module 1101 detects, on a carrier corresponding to the second base station, the DRS signal sent by the second base station, and provides the DRS signal for the generating module 1105 or the obtaining module 1106.

The DRS signal is a sparse synchronization signal in a time domain, and a time period is in seconds or longer. Generally, the second base station periodically sends a DRS signal in a sleep state. The DRS signal includes ID information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The DRS signal may be an existing synchronization signal, such as a PSS signal or an SSS signal; or the DRS signal may be a new discovery pilot (New Discovery Reference Signal, NDRS) signal that is newly defined by the second base station.

It should be noted that the apparatus may include the generating module 1105 and/or the obtaining module 1106.

Optionally, the generating module 1105 generates an uplink signal according to the DRS signal detected by the detection module 1101, and provides the uplink signal for the sending module 1104.

The uplink signal may be a RACH signal, or the uplink signal may be an SRS signal. The uplink signal is used to instruct the second base station to send the RRM-RS signal.

The sending module 1104 sends, according to the uplink signal generated by the generating module 1105, the uplink signal to the second base station on the carrier corresponding to the second base station, so that the second base station starts to send the RRM-RS signal according to the uplink signal.

Optionally, the obtaining module 1106 parses the DRS signal that is sent by the second base station and detected by the detection module 1101, to obtain first information of the second base station, and provides the first information for the sending module 1104.

The first information is used to instruct the first base station to trigger the second base station to send the RRM-RS signal, where the first information includes the ID information of the second base station and the frequency channel number information of the second base station.

The sending module 1104 sends the first information obtained by the obtaining module 1106 to the first base station, so that the first base station sends an instruction that triggers the second base station to send the RRM-RS signal, that is, the instruction is a trigger instruction.

It should be noted that when the UE is UE that supports carrier aggregation, the receiving module 1102 receives an activation instruction sent by the first base station and provides the activation instruction for the activation module 1107.

The activation module 1107 activates, according to the activation instruction that is sent by the first base station and received by the receiving module 1102, the carrier corresponding to the second base station, so that the UE can be served by the first base station and the second base station at the same time.

It should be noted that because content such as specific implementation processes of various modules and information exchange between the various modules in the apparatus shown in FIG. 11 and FIG. 12 is based on a same invention concept as the method embodiments of the present invention, refer to the method embodiments, and details are not described herein again.

In the apparatus for assisting a terminal in measuring according to this embodiment of the present invention, a detection module detects a discovery pilot DRS signal sent by a second base station; after the detection module detects the DRS signal, a receiving module receives a radio resource management pilot RRM-RS signal sent by the second base station, and provides the RRM-RS signal for a measurement module; the measurement module performs measurement on the second base station according to the RRM-RS signal received by the receiving module to obtain a measurement result, and provides the measurement result for a sending module; the sending module sends the measurement result obtained by the measurement module to a first base station, so that the first base station instructs, according to the measurement result, the second base station to start up, and hands over UE to the second base station. Compared with a problem in the prior art that because a DRS signal is a sparse synchronization signal in a time domain, and a time period is in seconds or longer, the UE performs erroneous determining on a signal of the second base station, in this embodiment of the present invention, correct measurement on signal strength of a micro base station may be implemented, thereby preventing the UE from incorrectly determining the signal strength of the micro base station.

Figure 13:
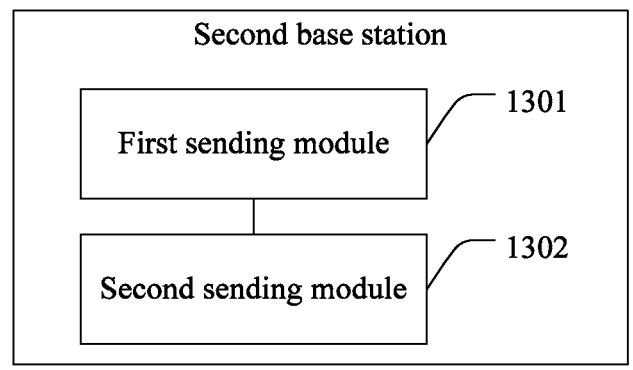
FIG. 13 is a block diagram of another apparatus for assisting a terminal in measuring according to an embodiment of the present invention.

As shown in FIG. 13, an embodiment of the present invention provides another apparatus for assisting a terminal in measuring, including: a first sending module 1301 and a second sending module 1302. The apparatus may be a second base station, and the second base station may be a micro base station.

The first sending module 1301 is configured to periodically send a DRS signal.

In a sleep state, the second base station may reduce power and reduce interference to a neighboring cell. It should be noted that when the second base station is in the sleep state, the first sending module 1301 periodically sends a DRS signal. The DRS signal is a sparse synchronization signal in a time domain, and a time period is in seconds or longer. The DRS signal includes ID information of a cell formed by the second base station, frequency channel number information of the second base station, and frequency domain information, time domain information, and sequence information of an RRM-RS signal. The ID information of the cell formed by the second base station includes a cell ID and/or a cell virtual ID. The first sending module 1301 may reuse an existing synchronization signal, such as a PSS signal or an SSS signal; or the first sending module 1301 may send a newly defined NDRS signal, and in this case, a sending period of the NDRS signal may be greater than or equal to a sending period of the existing synchronization signal. For example, the sending period of the existing synchronization signal may be 5 ms.

The second sending module 1302 is configured to send the RRM-RS signal, so that UE receives the RRM-RS signal and performs measurement on the second base station according to the RRM-RS signal.

The RRM-RS signal may be a CRS signal, or the RRM-RS signal may be a CSI-RS signal, so that the UE performs the measurement on the second base station according to a different type of the RRM-RS signal.

Figure 14:
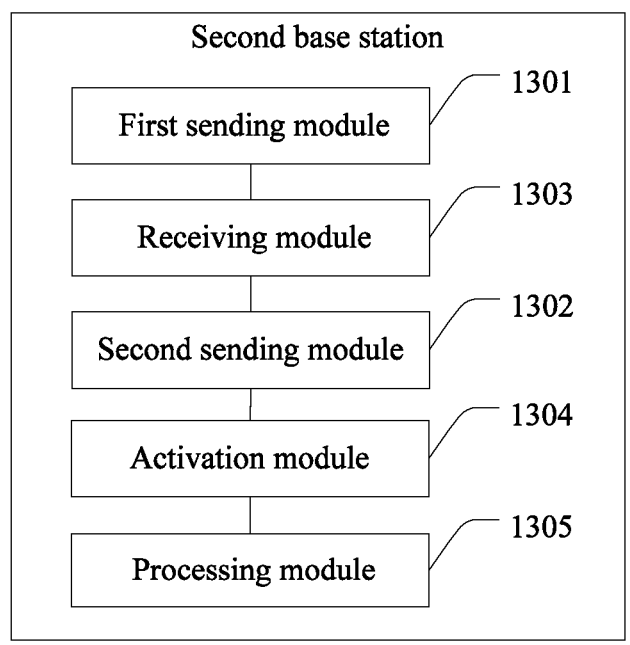
FIG. 14 is a block diagram of another apparatus for assisting a terminal in measuring according to an embodiment of the present invention.

Further, as shown in FIG. 14, the apparatus further includes a receiving module 1303, an activation module 1304, and a processing module 1305.

The receiving module 1303 receives an uplink signal sent by the UE, and provides the uplink signal for the second sending module 1302, where the uplink signal is used to trigger the second base station to send the RRM-RS signal, and the uplink signal is an uplink random access RACH signal or the uplink signal is an uplink sounding pilot SRS signal; or the receiving module 1303 receives a trigger instruction sent by a first base station, and provides the trigger instruction for the second sending module 1302, where the trigger instruction is used to trigger the second base station to send the RRM-RS signal.

After the receiving module 1303 receives the uplink signal sent by the UE or receives the trigger instruction sent by the first base station, the second sending module 1302 starts to send the RRM-RS signal according to the uplink signal that is sent by the UE and received by the receiving module 1303; or the second sending module 1302 starts to send the RRM-RS signal according to the trigger instruction that is sent by the first base station and received by the receiving module 1303; or after the first sending module sends a DRS signal, the second sending module sends the RRM-RS signal for a third predetermined time, where the third predetermined time is a time within a period of sending the DRS signal except a time of sending the DRS signal or a predetermined time within a period of sending the DRS signal. For an implementation period of sending the DRS signal by the second base station, refer to FIG. 4, and details are not described herein again.

The receiving module 1303 receives a wake-up instruction sent by the first base station, and provides the wake-up instruction for the activation module 1304; the activation module 1304 starts up the second base station according to the wake-up instruction received by the receiving module 1303. In this case, it may be considered that the second base station enters an activated state.

When the receiving module 1303 does not receive the wake-up instruction within a second predetermined time, the processing module 1305 stops sending the RRM-RS signal.

It should be noted that the UE receives the RRM-RS signal, performs measurement on signal strength of the second base station according to the RRM-RS signal, and sends an obtained measurement result to the first base station; the first base station determines the measurement result by using a handover decision algorithm to determine whether the second base station may start up. When determining that the second base station may start up, the first base station sends the wake-up instruction to the receiving module 1303 of the second base station.

It should be noted that because content such as specific implementation processes of various modules and information exchange between the various modules in the apparatus shown in FIG. 13 and FIG. 14 is based on a same invention concept as the method embodiments of the present invention, refer to the method embodiments, and details are not described herein again.

In the apparatus for assisting a terminal in measuring according to this embodiment of the present invention, a first sending module periodically sends a discovery pilot DRS signal; a second sending module sends a radio resource management pilot RRM-RS signal, so that user equipment UE receives the RRM-RS signal, and performs measurement on a second base station according to the RRM-RS signal. Compared with a problem in the prior art that the second base station sends only the DRS signal, causing that UE incorrectly determines signal strength of the second base station, or the second base station sends both the DRS signal and the RRM-RS signal, causing a waste of resources, in this embodiment of the present invention, correct measurement on signal strength of a micro base station may be implemented, thereby preventing the UE from incorrectly determining the signal strength of the micro base station and achieving objectives of reducing power and reducing interference to a neighboring cell.

Figure 15:
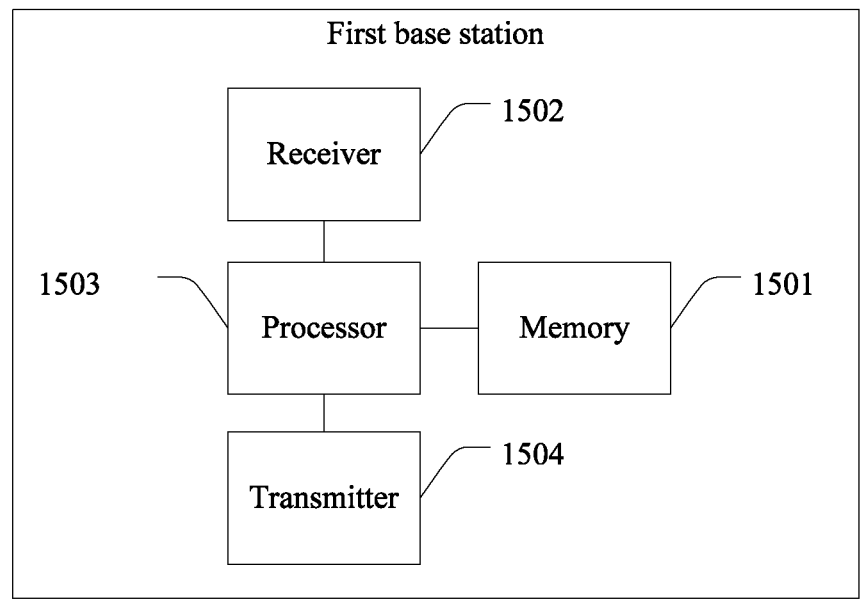
FIG. 15 is a block diagram of another apparatus for assisting a terminal in measuring according to an embodiment of the present invention.

As shown in FIG. 15, an embodiment of the present invention provides another apparatus for assisting a terminal in measuring, including: a memory 1501, a receiver 1502, a processor 1503, and a transmitter 1504. The apparatus may be a first base station, and the first base station may be a macro base station.

The memory 1501 is configured to store information including a program routine.

The receiver 1502 is configured to receive a measurement result for a second base station and sent by UE, where the first base station provides a service for the UE; and provide the measurement result for the processor 1503.

The second base station is a micro base station. The macro base station has a strong signal, a wide coverage scope, heavy traffic to bear, and a large floor area; the micro base station has low power, a small floor area, a small signal coverage scope, easy planning, and a capability of increasing a hotspot capacity. The measurement result of the second base station includes RSRP and RSRQ.

The processor 1503 is connected to the memory 1501, the receiver 1502, and the transmitter 1504, is configured to control execution of the program routine, and is specifically configured to determine, according to the measurement result received by the receiver 1502, whether a handover operation needs to be started; when the handover operation needs to be started, instruct the second base station to start up, and hand over the UE to the second base station for a service provided by the second base station.

The processor 1503 may analyze the measurement result by using a handover decision algorithm to determine whether the processor 1503 needs to start the handover operation. When a value of the RSRP in the measurement result is greater than or equal to a threshold CH1, and when a value of the RSRQ is greater than or equal to a threshold CH2, the processor 1503 determines to start the handover operation, and then the transmitter 1504 sends a wake-up instruction to the second base station, where the wake-up instruction is used to instruct the second base station to start up. When the second base station starts up, it may be considered that the second base station enters an activated state. When the second base station is in the activated state, the processor 1503 hands over the UE to the second base station. It may be understood that the handover operation is an inter-frequency handover operation, or the handover operation is an intra-frequency handover operation.

On the contrary, when the value of the RSRP in the measurement result is less than the threshold CH1, and/or when the value of the RSRQ is less than the threshold CH2, the processor 1503 determines not to start the handover operation.

It should be noted that when the UE is UE that supports carrier aggregation, the processor 1503 determines, according to the measurement result received by the receiver 1502, whether an activation instruction needs to be sent to the UE that supports carrier aggregation, so that the UE activates, according to the activation instruction, a carrier corresponding to the second base station.

It should be noted that because content such as specific implementation processes of various modules and information exchange between the various modules in the apparatus shown in FIG. 15 is based on a same invention concept as the method embodiments of the present invention, refer to the method embodiments, and details are not described herein again.

In the apparatus for assisting a terminal in measuring according to this embodiment of the present invention, correct measurement on signal strength of a micro base station may be implemented, thereby preventing UE from incorrectly determining the signal strength of the micro base station and achieving objectives of reducing power and reducing interference to a neighboring cell.

Figure 16:
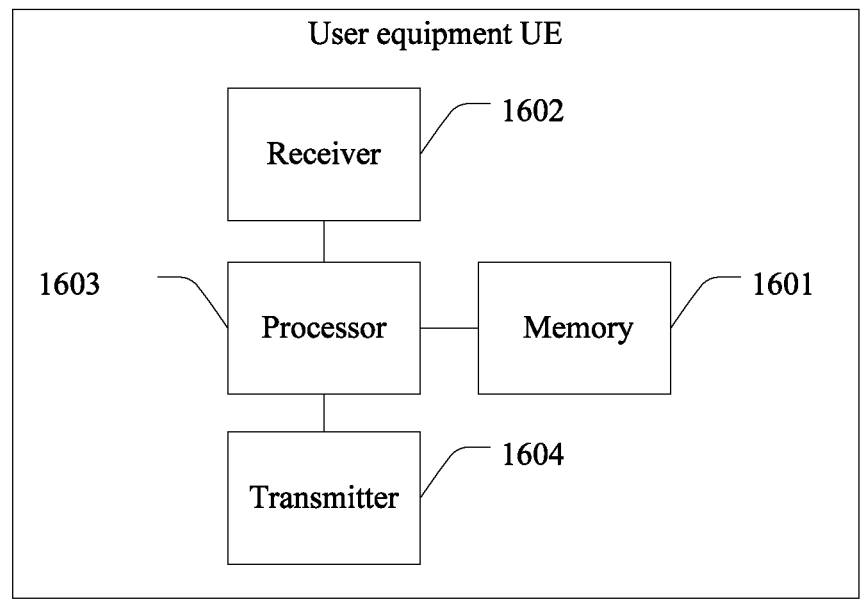
FIG. 16 is a block diagram of another apparatus for assisting a terminal in measuring according to an embodiment of the present invention.

As shown in FIG. 16, an embodiment of the present invention provides another apparatus for assisting a terminal in measuring, including: a memory 1601, a receiver 1602, a processor 1603, and a transmitter 1604; the apparatus may be UE.

The memory 1601 is configured to store information including a program routine.

The receiver 1602 is configured to receive an RRM-RS signal sent by a second base station, and provide the RRM-RS signal for the processor 1603.

The RRM-RS signal is a CRS signal, or the RRM-RS signal is a channel state information pilot CSI-RS signal. It may be understood that the second base station is a micro base station.

After the receiver 1602 receives the RRM-RS signal, the processor 1603 that is connected to the memory 1601, the receiver 1602, and the transmitter 1604 is configured to control execution of the program routine, and is specifically configured to perform, according to the RRM-RS signal received by the receiver 1602, measurement on the second base station to obtain a measurement result, and provide the measurement result for the transmitter 1604.

When the RRM-RS signal is a CRS signal, the UE performs RRM measurement on the second base station according to the CRS signal to obtain a first measurement result, where the first measurement result includes RSRP and RSRQ; or when the RRM-RS signal is a CSI-RS signal, the UE performs RRM measurement on the second base station according to the CSI-RS signal to obtain a second RRM measurement result, where the second measurement result includes CSI-RSRP.

After the processor 1603 obtains the first measurement result or the second measurement result, the transmitter 1604 is configured to send the first measurement result or the second measurement result obtained by the processor 1603 to a first base station, so that the first base station determines, according to the first measurement result or the second measurement result, whether to instruct the second base station to start up, and hands over the UE to the second base station.

Specifically, the transmitter 1604 sends the RSRP and the RSRQ to the first base station.

Further, the receiver 1602 is further configured to start to receive the RRM-RS signal after waiting for a first predetermined time; or the receiver 1602 is further configured to receive a first control instruction sent by the first base station, and start to receive the RRM-RS signal according to the first control instruction, where the first control instruction is used to instruct the UE to receive the RRM-RS signal; or the receiver 1602 is further configured to receive a second control instruction sent by the second base station, and start to receive the RRM-RS signal according to the second control instruction, where the second control instruction is used to instruct the UE to receive the RRM-RS signal.

Further, before the receiver 1602 receives the RRM-RS signal, the processor 1603 is further configured to detect, on a carrier corresponding to the second base station, the DRS signal sent by the second base station; then, generate an uplink signal according to the DRS signal, and provide the uplink signal for the transmitter 1604.

The transmitter 1604 sends, according to the uplink signal generated by the processor 1603, the uplink signal to the second base station on the carrier corresponding to the second base station, so that the second base station starts to send the RRM-RS signal according to the uplink signal.

The uplink signal is a RACH signal, or the uplink signal is an SRS signal.

Further, the processor 1603 is further configured to parse the DRS signal sent by the second base station, to obtain first information of the second base station, and provide the first information for the transmitter 1604, where the first information is used to instruct the first base station to trigger the second base station to send the RRM-RS signal.

The transmitter 1604 sends the first information obtained by the processor 1603 to the first base station, so that the first base station sends an instruction that triggers the second base station to send the RRM-RS signal, that is, the instruction is a trigger instruction.

It should be noted that when the UE is UE that supports carrier aggregation, the receiver 1602 is further configured to receive an activation instruction sent by the first base station, and provide the activation instruction for the processor 1603.

The processor 1603 activates, according to the activation instruction that is sent by the first base station and received by the receiver 1602, the carrier corresponding to the second base station, so that the UE can be served by the first base station and the second base station at the same time.

It should be noted that because content such as specific implementation processes of various modules and information exchange between the various modules in the apparatus shown in FIG. 16 is based on a same invention concept as the method embodiments of the present invention, refer to the method embodiments, and details are not described herein again.

In the apparatus for assisting a terminal in measuring according to this embodiment of the present invention, correct measurement on signal strength of a micro base station may be implemented, thereby preventing UE from incorrectly determining the signal strength of the micro base station and achieving objectives of reducing power and reducing interference to a neighboring cell.

Figure 17:
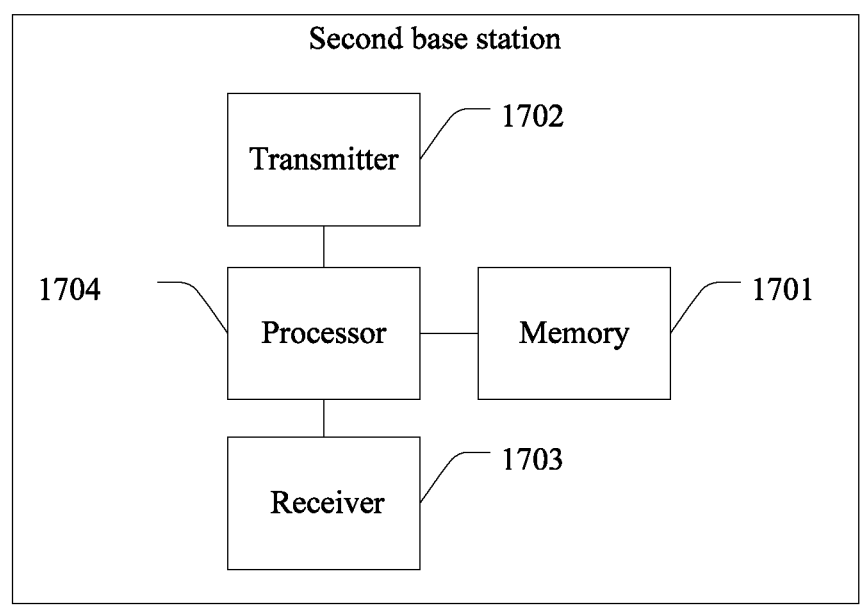
FIG. 17 is a block diagram of another apparatus for assisting a terminal in measuring according to an embodiment of the present invention.

As shown in FIG. 17, an embodiment of the present invention provides another apparatus for assisting a terminal in measuring, including: a memory 1701, a transmitter 1702, a receiver 1703, and a processor 1704; the apparatus may be a second base station.

The memory 1701 is configured to store information including a program routine.

The transmitter 1702 is configured to periodically send a DRS signal, and send an RRM-RS signal, so that UE performs measurement on the second base station according to the RRM-RS signal after detecting the DRS signal.

The transmitter 1702 may reuse an existing synchronization signal, such as a PSS signal or an SSS signal; or the transmitter 1702 may send a newly defined NDRS signal. In this case, a sending period of the NDRS signal may be greater than or equal to a sending period of the existing synchronization signal. For example, the sending period of the existing synchronization signal may be 5 ms.

After the receiver 1703 receives an uplink signal sent by the UE and provides the uplink signal for the transmitter 1702, the transmitter 1702 starts to send the RRM-RS signal according to the uplink signal that is sent by the UE and received by the receiver 1703, where the uplink signal is used to trigger the second base station to send the RRM-RS signal, and the uplink signal may be a RACH signal or an SRS signal; or after the receiver 1703 receives a trigger instruction sent by a first base station and provides the trigger instruction for the transmitter 1702, the transmitter 1702 starts to send the RRM-RS signal according to the trigger instruction that is sent by the first base station and received by the receiver 1703, where the trigger instruction is used to trigger the second base station sends a message of the RRM-RS signal; or after sending a DRS signal, the transmitter 1702 sends the RRM-RS signal for a third predetermined time, where the third predetermined time is a time within a period of sending the DRS signal except a time of sending the DRS signal or a predetermined time within a period of sending the DRS signal.

The RRM-RS signal may be a CRS signal, or the RRM-RS signal may be a CSI-RS signal, so that the UE performs the measurement on the second base station according to a different type of the RRM-RS signal.

When the UE receives the RRM-RS signal, performs measurement on signal strength of the second base station according to the RRM-RS signal, and sends an obtained measurement result to the first base station, the first base station determines the measurement result by using a handover decision algorithm to determine whether the second base station may start up. When determining that the second base station may start up, the first base station sends a wake-up instruction to the receiver 1703 of the second base station.

The receiver 1703 receives the wake-up instruction sent by the first base station, and provides the wake-up instruction for the processor 1704.

The processor 1704 is connected to the memory 1701, the transmitter 1702, and the receiver 1703, is configured to control execution of the program routine, and is specifically configured to start up the second base station according to the wake-up instruction received by the receiver 1703.

When the receiver 1703 does not receive the wake-up instruction within a second predetermined time, the processor 1704 stops sending the RRM-RS signal, where the second predetermined time is a time set by the second base station.

It should be noted that because content such as specific implementation processes of various modules and information exchange between the various modules in the apparatus shown in FIG. 17 is based on a same invention concept as the method embodiments of the present invention, refer to the method embodiments, and details are not described herein again.

In the apparatus for assisting a terminal in measuring according to this embodiment of the present invention, correct measurement on signal strength of a micro base station may be implemented, thereby preventing UE from incorrectly determining the signal strength of the micro base station and achieving objectives of reducing power and reducing interference to a neighboring cell.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for assisting a terminal in measuring, the method comprising:
    detecting, by the terminal served by a first base station when the terminal enters or is at an edge of a coverage area of a second base station, a discovery reference signal (DRS) periodically sent by the second base station, wherein the DRS signal comprises (a) ID information of a cell formed by the second base station, (b) frequency information of the second base station, (c) frequency and time domain information of a radio resource management reference signal (RRM-RS) and (d) sequence information of the RRM-RS;
    receiving, by the terminal after detecting the DRS, the RRM-RS periodically sent by the second base station for a predetermined time that is within a period of time for sending the DRS except (a) a time of sending the DRS or (b) another predetermined time within the period of time for sending the DRS;
    performing, by the terminal, measurement on the second base station according to the RRM-RS to obtain a measurement result; and
    sending, by the terminal, the measurement result to the first base station.

2. The method according to claim 1, wherein the RRM-RS is a common reference signal (CRS) or a channel state information reference signal (CSI-RS).

3. The method according to claim 1, before the terminal receives the RRM-RS, the method further comprises:
    parsing, by the terminal, the DRS when detecting, on a carrier corresponding to the second base station, the DRS sent by the second base station to obtain first information of the second base station, wherein the first information is used to instruct the first base station to trigger the second base station to send the RRM-RS; and
    sending, by the terminal, the first information to the first base station.

4. A method for assisting a terminal in measuring, wherein the terminal is served by a first base station, the method comprising:

periodically sending, by a second base station, a discovery reference signal (DRS) for the terminal to detect the DRS when the terminal enters or is at an edge of a coverage scope of the second base station, wherein the DRS signal comprises (a) ID information of a cell formed by the second base station, (b) frequency information of the second base station, (c) frequency and time domain information of a radio resource management reference signal (RRM-RS) and (d) sequence information of the RRM-RS;

periodically sending, by the second base station, the RRM-RS for a predetermined time after sending the DRS to the terminal, so that the terminal performs measurement on the second base station according to the RRM-RS after detecting the DRS, wherein the predetermined time is a time within a period of time for sending the DRS except (a) a time of sending the DRS or (b) another predetermined time within the period of time for sending the DRS; and receiving, by the second base station, a wake-up instruction from the first base station that receives a measurement result of the measurement on the second base station and determines to wake up the second base station according to the measurement result.

5. The method according to claim 4, wherein the RRM-RS is a channel state information reference signal (CSI-RS) or a common reference signal (CRS).

6. A device for assisting a terminal in measuring, the device comprising a processor and a non-transitory computer readable storage medium, wherein the non-transitory computer readable storage medium stores a program, and when the program is executed by the processor, the following are performed:

detecting a discovery reference signal (DRS) when the terminal served by a first base station enters or is at an edge of a coverage area of a second base station, wherein the DRS is sent periodically by the second base station, and comprises (a) ID information of a cell formed by the second base station, (b) frequency information of the second base station, (c) frequency and time domain information of a radio resource management reference signal (RRM-RS) and (d) sequence information of the RRM-RS;

receiving the RRM-RS periodically sent by the second base station for a predetermined time within a period of time for sending the DRS except (a) a time of sending the DRS or (b) another predetermined time within the period of time for sending the DRS;

performing measurement on the second base station according to the RRM-RS to obtain a measurement result; and sending the measurement result to the first base station.

7. The device according to claim 6, wherein the RRM-RS is a channel state information reference signal (CSI-RS) or a common reference signal (CRS).

8. The device according to claim 6, wherein when the program is executed by the processor, the following are further performed:

before receiving the RRM-RS,
a) parsing the DRS when detecting, on a carrier corresponding to the second base station, the DRS sent by the second base station to obtain first information of the second base station, wherein the first information is used to instruct the first base station to trigger the second base station to send the RRM-RS; and
b) sending the first information to the first base station.

9. The device according to claim 6, wherein when the program is executed by the processor, the following is further performed:

activating, after receiving an activation instruction sent by the first base station, a carrier corresponding to the second base station, so that the terminal is served by the second base station.

10. The device according to claim 6, wherein when the program is executed by the processor, the following is further performed:

receiving a control instruction is used to instruct the terminal to receive the RRM-RS, wherein the receiving comprises starting to receive the RRM-RS according to the control instruction, wherein, the control instruction is sent by the first base station or the second base station.

11. The device according to claim 6, wherein when the program is executed by the processor, the following is further performed: before receiving the RRM-RS, sending, after detecting the DRS on a carrier corresponding to the second base station, an uplink signal to the second base station on the carrier, so that the second base station starts to send the RRM-RS signal according to the uplink signal.

12. A device at a second base station for assisting a terminal in measuring, where the terminal is served by a first base station, the device comprising a processor and a non-transitory computer readable storage medium that stores a program, and when the program is executed by the processor, the following are performed:

periodically sending a discovery reference signal (DRS) for the terminal to detect the DRS when the terminal enters or is at an edge of a coverage scope of the second base station, wherein the DRS signal comprises (a) ID information of a cell formed by the second base station, (b) frequency information of the second base station, (c) frequency and time domain information of a radio resource management reference signal (RRM-RS), and (d) sequence information of the RRM-RS; and periodically sending the RRM-RS for a predetermined time after sending the DRS to the terminal, so that the terminal performs measurement on the second base station according to the RRM-RS after detecting the DRS, wherein the predetermined time is a time within a period of time for sending the DRS except (a) a time of sending the DRS or (b) another predetermined time within the period of time for sending the DRS; and receiving a wake-up instruction from the first base station that receives a measurement result of the measurement on the second base station and determines to wake up the second base station according to the measurement result.

13. The device according to claim 12, wherein the RRM-RS is a channel state information reference signal (CSI-RS) or a common reference signal (CRS).

14. The device according to claim 12, wherein when the program is executed by the processor, the following are further performed:

after the sending the RRM-RS,
a) receiving a wake-up instruction sent by the first base station; and
b) starting up according to the wake-up instruction.

* * * * *